United States Patent
Nakatsuji et al.

(10) Patent No.: US 6,989,872 B2
(45) Date of Patent: Jan. 24, 2006

(54) IMAGE DISTORTION CORRECTING DEVICE AND IMAGE DISTORTION CORRECTING METHOD

(75) Inventors: Masanori Nakatsuji, Ibaraki (JP); Masanobu Tanaka, Hirakata (JP); Hideyo Uwabata, Takatsuki (JP); Naoji Okumura, Mino (JP); Kazunori Yamate, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 504 days.

(21) Appl. No.: 10/088,106

(22) PCT Filed: Jul. 23, 2001

(86) PCT No.: PCT/JP01/06336

§ 371 (c)(1),
(2), (4) Date: Mar. 22, 2002

(87) PCT Pub. No.: WO02/09418

PCT Pub. Date: Jan. 31, 2002

(65) Prior Publication Data

US 2002/0135705 A1 Sep. 26, 2002

(30) Foreign Application Priority Data

Jul. 25, 2000 (JP) ........................................ 2000-224415
Jun. 29, 2001 (JP) ........................................ 2001-200115

(51) Int. Cl.
*H04N 3/23* (2006.01)

(52) U.S. Cl. ....................................... 348/806; 348/746
(58) Field of Classification Search ................. 348/806, 348/807, 745, 746, 747, 536, 537, 540, 547; 315/368.15, 368.18, 370, 371; H04N 3/23, H04N 3/22, 3/26
See application file for complete search history.

(56) References Cited

U.S. PATENT DOCUMENTS

| | | | |
|---|---|---|---|
| 4,970,442 A | 11/1990 | Harada | |
| 4,992,706 A | 2/1991 | Troemel et al. | |
| 5,290,681 A | 3/1994 | Kuroda et al. | |
| 5,389,859 A | 2/1995 | Stessen et al. | |
| 5,444,500 A * | 8/1995 | Ten Pierick et al. | 348/807 |
| 5,764,297 A | 6/1998 | Sengoku | |
| 6,002,454 A | 12/1999 | Kajiwara et al. | |
| 6,480,242 B1 | 11/2002 | Okada | 348/807 |
| 6,534,920 B1 * | 3/2003 | Uwabata et al. | 315/371 |

FOREIGN PATENT DOCUMENTS

| | | |
|---|---|---|
| EP | 0443678 | 8/1991 |
| EP | 0589512 | 3/1994 |
| EP | 821519 | 1/1998 |
| JP | 06230736 | 8/1994 |
| JP | 7-162702 | 6/1995 |
| JP | 7-298086 | 11/1995 |
| JP | 10-42163 | 2/1998 |
| JP | 2822469 | 9/1998 |
| JP | 11-122562 | 4/1999 |
| JP | 2000-138946 | 5/2000 |
| JP | 10-42163 | 6/2000 |

OTHER PUBLICATIONS

Partial English Language Translation for JP Appln. No. 7–162702.
English Language Abstract of JP 7–298086.
English Language Abstract of JP 11–122562.
English Language Abstract of JP 2000–138946.
English Language Abstract of JP 10–42163.

* cited by examiner

*Primary Examiner*—Sherrie Hsia
(74) *Attorney, Agent, or Firm*—Greenblum & Bernstein, P.L.C.

(57) ABSTRACT

A write PLL circuit generates a write clock signal for writing a video signal into a line memory. A readout PLL circuit generates a read clock signal for reading out the video signal stored in the line memory. An inner pincushion distortion correction voltage generation circuit modulates a correction waveform in the horizontal scanning period of time by a correction waveform in the vertical scanning period of time, to generate an inner pincushion distortion correction waveform, and adds a DC correction pulse to the inner pincushion distortion correction waveform and outputs the inner pincushion distortion correction waveform as an inner pincushion distortion correction voltage. A capacitive coupling circuit superimposes the inner pincushion distortion correction voltage on an output voltage of a loop filter of the readout PLL circuit, and feeds the inner pincushion distortion correction voltage to a VCO as a control voltage.

31 Claims, 16 Drawing Sheets

F I G. 1 0
(a) (CORRECTION WAVEFORM IN THE HORIZONTAL SCANNING PERIOD)
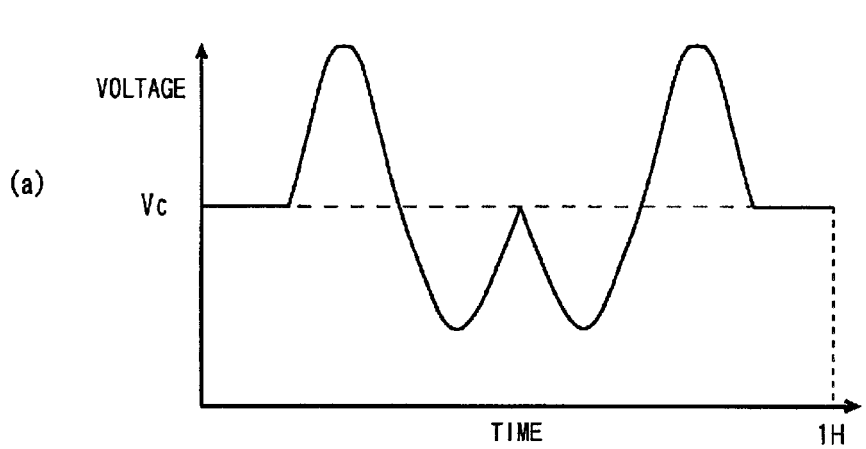
(b) (CORRECTION WAVEFORM IN THE VERTICAL SCANNING PERIOD)
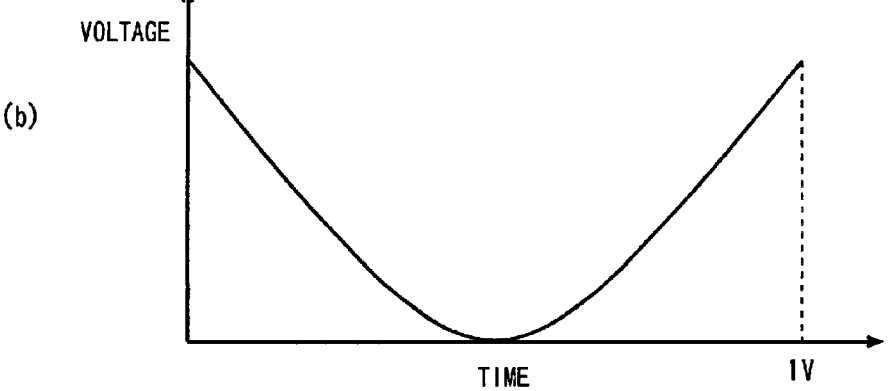
(c) (INNER PINCUSHION DISTORTION CORRECTION WAVEFORM)
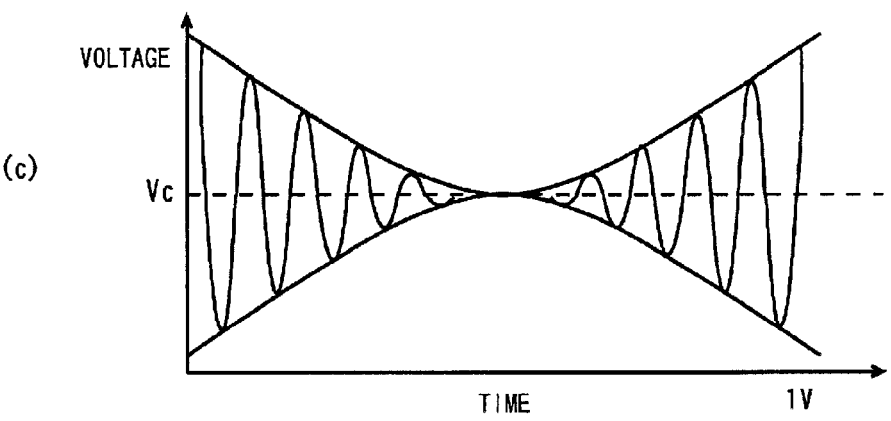

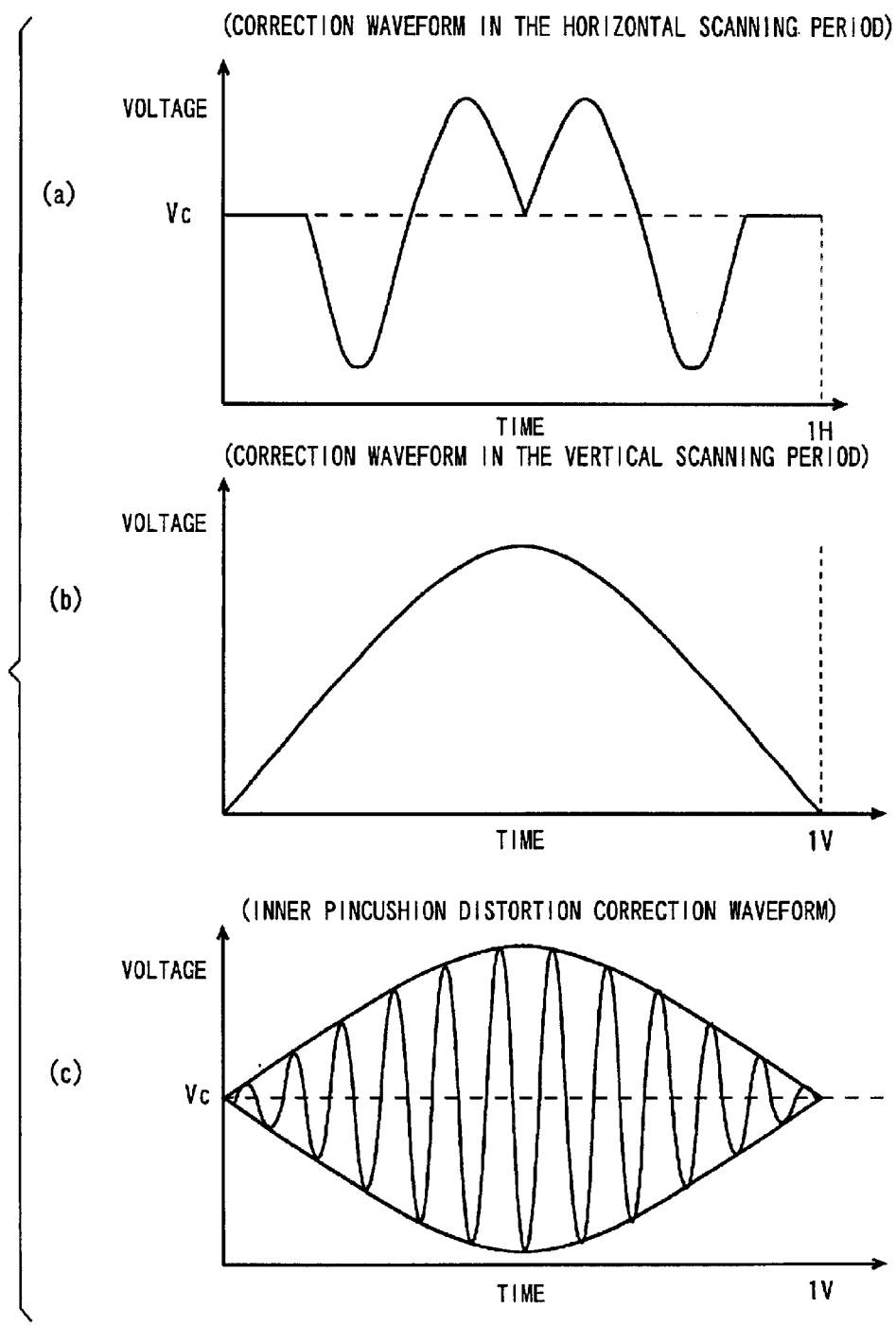

F I G. 1 2
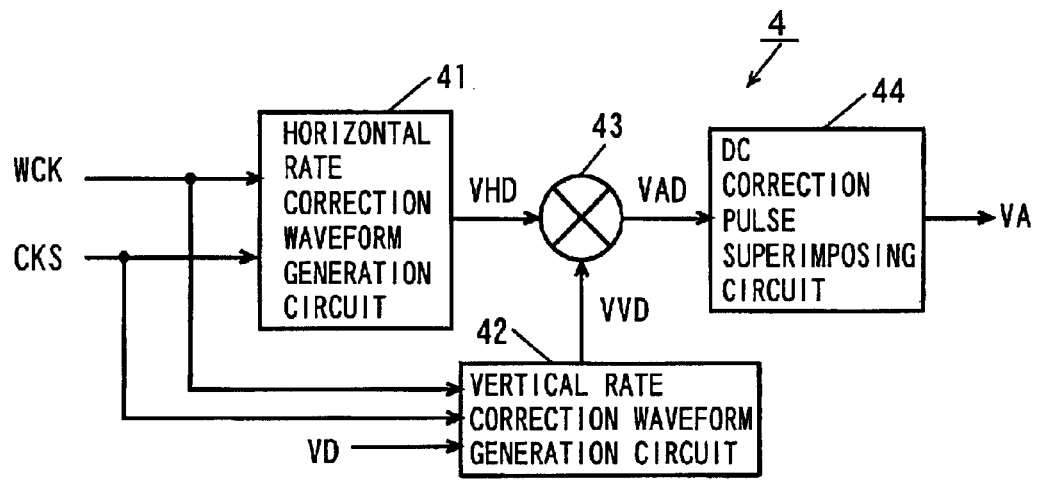
F I G. 1 3
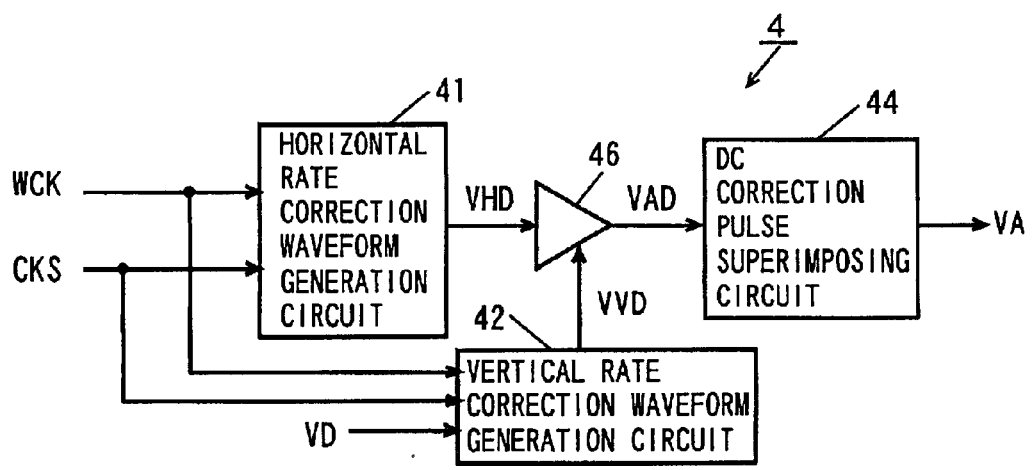

F I G. 2 1
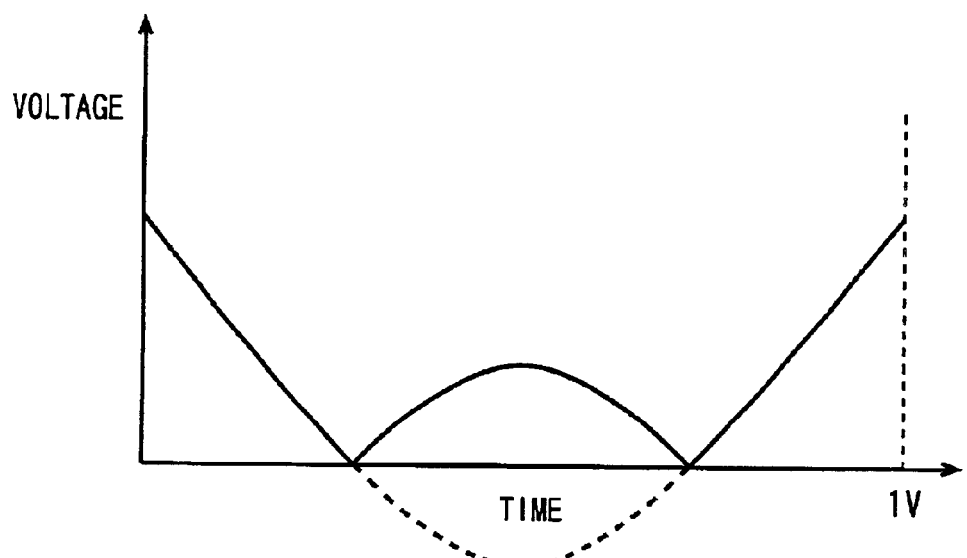

IMAGE DISTORTION CORRECTING DEVICE AND IMAGE DISTORTION CORRECTING METHOD

TECHNICAL FIELD

The present invention relates to an image distortion correcting apparatus and an image distortion correcting method for correcting distortion in an image displayed on a screen on the basis of a video signal.

BACKGROUND ART

In a CRT (Cathode-Ray Tube), an electron beam is deflected by a deflecting magnetic field and is irradiated onto its fluorescent surface, to display an image on a screen. The radius of the fluorescent surface of the CRT is larger than a radius from a deflecting center point of the electron beam to the fluorescent surface. Accordingly, the amount of movement of the electron beam in the periphery of the screen relative to the same amount of deflection is larger than the amount of movement of the electron beam at the center of the screen. As a result, when cross-hatched patterns which are inherently equally spaced are displayed on the screen, there occurs such a phenomenon that the spacing between the cross-hatched patterns is widened toward the periphery of the screen from the center thereof.

Such a phenomenon occurs in both the horizontal direction and the vertical direction of the screen. Since the difference in deflection in the horizontal direction is larger than that in the vertical direction, however, the distortion in the image significantly appears. Such distortion in the image is called east-west pincushion distortion. Therefore, a deflection current is generally caused to flow such that the amount of deflection in the periphery of the screen is reduced to correct the east-west pincushion distortion.

When the east-west pincushion distortion is corrected such that vertical lines at right and left ends of the image on the screen are straight lines, however, there occurs such a phenomenon that vertical lines to be straight lines in intermediate portions between the center and the right end and between the center and the left end are curved inward. Such a phenomenon is called inner pincushion distortion.

As the CRT is thinned and flattened, the inner pincushion distortion is increased. In order to correct the inner pincushion distortion thus increased, the amount of the correction must be increased.

In the CRT, the electron beam is deflected by the deflecting magnetic field to display the image on the screen, as described above. In this case, in order to generate the deflecting magnetic field, a deflection current of several App (ampere peak-peak) is caused to flow in a deflection yoke in a deflection circuit. When the inner pincushion distortion is corrected in the deflection circuit, the deflection current is modulated. However, the amount of the current is large. Accordingly, the larger the amount of correction becomes, the higher consumed power becomes in units of several watts (W). Therefore, it is difficult to correct the inner pincushion distortion by adjusting the deflection current in the deflection circuit while restraining the consumed power.

When the inner pincushion distortion is corrected in the deflection circuit, the circuit configuration becomes complicated, thereby preventing the cost from being reduced.

DISCLOSURE OF INVENTION

An object of the present invention is to provide a low-cost image distortion correcting apparatus capable of correcting distortion in an image without increasing consumed power and an image distortion correcting method.

An image distortion correcting apparatus for correcting distortion in an image displayed on a screen on the basis of a video signal according to an aspect of the present invention comprises a storage device for storing the video signal; a write clock signal generation circuit for generating a write clock signal for writing an inputted video signal into the storage device; a read clock signal generation circuit for generating a read clock signal for reading out the video signal stored in the storage device; a distortion correction waveform generation circuit for generating a distortion correction waveform for correcting the distortion in the image by shifting the positions of pixels displayed on the screen on the basis of the video signal; and a read clock signal control circuit for controlling the frequency of the read clock signal generated by the read clock signal generation circuit on the basis of the distortion correction waveform generated by the distortion correction waveform generation circuit, the distortion correction waveform generation circuit setting the distortion correction waveform such that the amount of shift of the pixel reaches zero at both ends and the center of the image in the horizontal scanning direction.

In the image distortion correcting apparatus according to the present invention, the video signal inputted in response to the write clock signal generated by the write clock signal generation circuit is written into the storage device, and the video signal stored in the storage device is read out in response to the read clock signal generated by the read clock signal generation circuit. At this time, the frequency of the read clock signal is controlled by the read clock signal control circuit on the basis of the distortion correction waveform generated by the distortion correction waveform generation circuit, so that the readout period of time of the video signal from the storage device is changed. Consequently, the positions of the pixels displayed on the screen are shifted on the basis of the video signal, so that the distortion in the image is corrected.

In this case, the distortion correction waveform is set such that the amount of shift of the pixel reaches zero at both the ends and the center of the image in the horizontal scanning direction. Accordingly, the positions at both the ends and the center of the image are not shifted.

It is thus possible to correct the distortion in the image by changing the read clock signal using the distortion correction waveform without changing a deflection current in a deflection circuit, so that power consumption is not increased. Further, it is possible to correct the distortion in the image by providing the distortion correction waveform generation circuit and the read clock signal control circuit without improving the deflection circuit. Accordingly, the circuit configuration is not complicated, thereby not preventing the cost from being reduced.

The distortion correction waveform generation circuit may comprise a first correction waveform generation circuit for generating a first correction waveform which is changed in a horizontal scanning period of time, a second correction waveform generation circuit for generating a second correction waveform which is changed in a vertical scanning period of time, and a modulation circuit for modulating the first correction waveform generated by the first correction waveform generation circuit by the second correction waveform generated by the second correction waveform generation circuit, to obtain the distortion correction waveform.

In this case, the first, correction waveform which is changed in the horizontal scanning period of time is modulated by the second correction waveform which is changed in the vertical scanning period of time, thereby obtaining the distortion correction waveform. Consequently, it is possible to correct the distortion in the image displayed on the screen over the whole of the image.

The second correction waveform may have inflection points, and the slope of at least one of a plurality of portions of the second correction waveform which are divided at the inflection points may be variably set.

In this case, the slope of at least one of the portions of the second correction waveform which are divided at the inflection points is adjusted, thereby making it possible to make the most suitable distortion correction over the whole in the vertical direction of the screen.

The modulation circuit may comprise a multiplication circuit for multiplying the first correction waveform generated by the first correction waveform generation circuit and the second correction waveform generated by the second correction waveform generation circuit.

In this case, the first correction waveform is modulated by the second correction waveform by multiplexing the first correction waveform and the second correction waveform, thereby obtaining the distortion correction waveform.

The modulation circuit may comprise an amplification circuit comprising an input terminal receiving the first correction waveform generated by the first correction waveform generation circuit and a gain control terminal receiving the second correction waveform generated by the second correction waveform generation circuit.

In this case, the first correction waveform is modulated to the second correction waveform by amplifying the first correction waveform with gain corresponding to the second correction waveform, thereby obtaining the distortion correction waveform.

The first correction waveform may correspond to the change in the frequency of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and the second correction waveform may be set such that the amplitudes thereof at the upper and lower ends in the vertical direction of the screen are larger than that at the center thereof.

When inner pincushion distortion is caused by east-west pincushion distortion correction, vertical lines in intermediate portions between the right end and the center and between the left end and the center out of a plurality of vertical lines displayed on the screen are curved inward. In this case, the positions of the pixels in upper and lower parts of the vertical line in the intermediate portion are shifted inward, thereby making it possible to correct the inner pincushion distortion.

The first correction waveform may correspond to the change in the frequency of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and the second correction waveform may be set such that the amplitude thereof at the center in the vertical direction of the screen is larger than those at the upper and lower ends thereof.

When inner pincushion distortion is caused by east-west pincushion distortion correction, vertical lines in intermediate portions between the right end and the center and between the left end and the center out of a plurality of vertical lines displayed on the screen are curved inward. In this case, the position of the pixel at the center of the vertical line in the intermediate portion is shifted outward, thereby making it possible to correct the inner pincushion distortion.

The read clock signal generation circuit may comprise a phase-locked loop having a voltage controlled oscillator for generating the read clock signal, and the distortion correction waveform generation circuit may output the distortion correction waveform as a distortion correction voltage, and the read clock signal control circuit may superimpose the distortion correction voltage outputted by the distortion correction waveform generation circuit on an oscillation frequency control voltage of the voltage controlled oscillator of the phase-locked loop.

In this case, the distortion correction voltage is superimposed on the oscillation frequency control voltage of the voltage controlled oscillator of the phase-locked loop, so that the frequency of the read clock signal is changed. Consequently, the readout period of time of the video signal read out of the storage device is changed, and the positions of the pixels displayed on the screen are shifted on the basis of the video signal, so that the distortion in the image is corrected.

The first correction waveform may correspond to the change in the period of time of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and the second correction waveform may be set such that the amplitudes thereof at the upper and lower ends in the vertical direction of the screen are larger than that at the center thereof.

When inner pincushion distortion is caused by east-west pincushion distortion correction, vertical lines in intermediate portions between the right end and the center and between the left end and the center out of a plurality of vertical lines displayed on the screen are curved inward. In this case, the positions of the pixels in upper and lower parts of the vertical line in the intermediate portion are shifted inward, thereby making it possible to correct the inner pincushion distortion.

The first correction waveform may correspond to the change in the period of time of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and the second correction waveform may be set such that the amplitude thereof at the center in the vertical direction of the screen is larger than those at the upper and lower ends thereof.

When inner pincushion distortion is caused by east-west pincushion distortion, vertical lines in intermediate portions between the right end and the center and between the left end and the center out of a plurality of vertical lines displayed on the screen are curved inward. In this case, the position of the pixel at the center of the vertical line in the intermediate portion is shifted outward, thereby making it possible to correct the inner pincushion distortion.

The read clock signal generation circuit may comprise a phase-locked loop having a voltage-controlled oscillator for generating the read clock signal, the distortion correction waveform generation circuit may further comprise a conversion circuit for converting the distortion correction waveform obtained by the modulation circuit into a distortion correction voltage corresponding to the change in the frequency of the read clock signal, and the read clock signal generation circuit may superimpose the distortion correction voltage outputted by the distortion correction waveform generation circuit on an oscillation frequency control voltage of the voltage controlled oscillator of the phase-locked loop.

In this case, the distortion correction voltage is superimposed on the oscillation frequency control voltage of the voltage controlled oscillator of the phase-locked loop, so that the frequency of the read clock signal is changed. Consequently, the readout period of the video signal read out of the storage device is changed. The positions of the pixels displayed on the screen are shifted on the basis of the video signal, so that the distortion in the image is corrected.

The video signal image distortion correcting apparatus may further comprise a correction pulse addition circuit for adding a correction pulse to the distortion correction voltage in a horizontal blanking interval such that the average of the distortion correction voltage in each horizontal scanning interval of the video signal becomes a predetermined value.

In this case, the average of the oscillation frequency control voltage of the voltage controlled oscillator in each horizontal scanning interval of the video signal becomes a predetermined value. Accordingly, the average of the frequency of the read clock signal generated by the voltage controlled oscillator becomes constant. In this way, the average of the oscillation frequency control voltage of the voltage controlled oscillator is not changed before and after the superimposition of the distortion correction voltage, so that the operation of the phase-locked loop is not changed.

The image distortion correcting apparatus may further comprise a correction pulse addition circuit for adding a correction pulse to the distortion correction voltage obtained by the conversion circuit in a horizontal blanking interval such that the average of the distortion correction voltage in each horizontal scanning interval of the video signal becomes a predetermined value.

In this case, the average of the oscillation frequency control voltage of the voltage controlled oscillator in each horizontal scanning interval of the video signal becomes a predetermined value. Accordingly, the average of the frequency of the read clock signal generated by the voltage controlled oscillator becomes constant. In this way, the average of the oscillation frequency control voltage of the voltage controlled oscillator is not changed before and after the superimposition of the distortion correction voltage, so that the operation of the phase-locked loop is not changed.

The correction pulse addition circuit may add the correction pulse to the distortion correction voltage before the time point where phase comparison in the phase-locked loop is made in the horizontal blanking interval such that the average of the distortion correction voltage becomes a predetermined value for each horizontal scanning interval.

The phase-locked loop may further have a frequency divider for dividing the frequency of the read clock signal outputted from the voltage controlled oscillator, a phase comparator for comparing the phase of an output signal of the frequency divider and the phase of a predetermined reference signal, and a loop filter for smoothing an output voltage of the phase comparator and inputting the smoothed output voltage to the voltage controlled oscillator through an output node, and the read clock signal control circuit may comprise an emitter follower transistor having its base receiving the distortion correction voltage outputted by the distortion correction waveform generation circuit, and a capacitance provided between the emitter of the transistor and the output node of the loop filter of the phase-locked loop.

In this case, the distortion correction voltage is superimposed on the oscillation frequency control voltage of the voltage controlled oscillator by the emitter follower transistor and the capacitance. Consequently, it is possible to control the frequency of the read clock signal on the basis of the distortion correction waveform by a simple circuit configuration.

The phase-locked loop may further have a frequency divider for dividing the frequency of the read clock signal outputted from the voltage controlled oscillator, a phase comparator for comparing the phase of an output signal of the frequency divider and the phase of a predetermined reference signal, and a loop filter for smoothing an output voltage of the phase comparator, and the read clock signal control circuit may comprise an addition circuit for adding the distortion correction voltage outputted by the distortion correction waveform generation circuit and an output voltage of the loop filter of the phase-locked loop and feeding a voltage obtained by the addition to the voltage controlled oscillator.

In this case, the distortion correction voltage and the output voltage of the loop filter of the phase-locked loop are added together, and are fed to the voltage controlled oscillator. The addition circuit is interposed between the distortion correction voltage and the loop filter, so that the distortion correction waveform is superimposed on the read clock signal without being distorted by the effect of the loop filter. Consequently, it is possible to control the frequency of the read clock signal on the basis of the distortion correction waveform.

An image distortion correcting method for correcting distortion in an image displayed on a screen on the basis of a video signal according to another aspect of the present invention comprises the steps of generating a write clock signal for writing an inputted video signal into a storage device; generating a read clock signal for reading out the video signal stored in the storage device; generating a distortion correction waveform for correcting the distortion in the image by shifting the positions of pixels displayed on the screen on the basis of the video signal; controlling the frequency of the read clock signal on the basis of the generated distortion correction waveform; and setting the distortion correction waveform such that the amount of shift of the pixel reaches zero at both ends and the center of the image in the horizontal scanning direction.

In the image distortion correcting method according to the present invention, the video signal inputted in response to the write clock signal is written into the storage device, and the video signal stored in the storage device is read out in response to the read clock signal. At this time, the frequency of the read clock signal is controlled on the basis of the distortion correction waveform, so that the readout period of time of the video signal from the storage device is changed. Consequently, the positions of the pixels displayed on the screen are shifted on the basis of the video signal, so that the distortion in the image is corrected.

In this case, the distortion correction waveform is set such that the amount of shift of the pixel reaches zero at both the ends and the center of the image in the horizontal scanning direction. Accordingly, the positions at both the ends and the center of the image are not shifted.

It is thus possible to correct the distortion in the image by changing the read clock signal using the distortion correction waveform without changing a deflection current in a deflection circuit, so that power consumption is not increased. Further, it is possible to correct the distortion in the image by generating the distortion correction waveform and controlling the read clock signal based on the distortion correction waveform without improving the deflection circuit. Accordingly, the circuit configuration is not complicated, thereby not preventing the cost from being reduced.

The step of generating the distortion correction waveform may comprise the steps of generating a first correction waveform which is changed in a horizontal scanning period of time, generating a second correction waveform which is changed in a vertical scanning period of time, and modulating the first correction waveform by the second correction waveform, to obtain the distortion correction waveform.

In this case, the first correction waveform which is changed in the horizontal scanning period of time is modulated by the second correction waveform which is changed in the vertical scanning period of time, thereby obtaining the distortion correction waveform. Consequently, it is possible to correct the distortion in the image over the whole of the image displayed on the screen.

The second correction waveform may have inflection points, and the step of generating the distortion correction waveform may further comprise the step of variably setting the slope of at least one of a plurality of portions of the second correction waveform which are divided at the inflection points.

In this case, the slope of at least one of the portions of the second correction waveform which are divided at the inflection points is adjusted, thereby making it possible to make the most suitable distortion correction over the whole in the vertical direction of the screen.

The first correction waveform may correspond to the change in the frequency of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and the second correction waveform may be set such that the amplitudes thereof at the upper and lower ends in the vertical direction of the screen are larger than that at the center thereof.

When inner pincushion distortion is caused by east-west pincushion distortion correction, vertical lines in intermediate portions between the right end and the center and between the left end and the center out of a plurality of vertical lines displayed on the screen are curved inward. In this case, the positions of the pixels in upper and lower parts of the vertical line in the intermediate portion are shifted inward, thereby making it possible to correct the inner pincushion distortion.

The first correction waveform may correspond to the change in the frequency of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and the second correction waveform may be set such that the amplitude thereof at the center in the vertical direction of the screen is larger than those at the upper and lower ends thereof.

When inner pincushion distortion is caused by,east-west pincushion distortion correction, vertical lines in intermediate portions between the right end and the center and between the left end and the center out of a plurality of vertical lines displayed on the screen are curved inward. In this case, the position of the pixel at the center of the vertical line in the intermediate portion is shifted outward, thereby making it possible to correct the inner pincushion distortion.

The step of generating the read clock signal may comprise the step of generating the read clock signal by a phase-locked loop having a voltage controlled oscillator, and the step of generating the distortion correction waveform may comprise the step of outputting the distortion correction waveform as a distortion correction voltage, and the step of controlling the frequency of the read clock signal may comprise the step of superimposing the outputted distortion correction voltage on an oscillation frequency control voltage of the voltage controlled oscillator of the phase-locked loop.

In this case, the distortion correction voltage is superimposed on the oscillation frequency control voltage of the voltage controlled oscillator of the phase-locked loop, so that the frequency of the read clock signal is changed. Consequently, the readout period of time of the video signal read out of the storage device is changed, and the positions of the pixels displayed on the screen are shifted on the basis of the video signal, so that the distortion in the image is corrected.

The first correction waveform may correspond to the change in the period of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and the second correction waveform may be set such that the amplitudes thereof at the upper and lower ends in the vertical direction of the screen are larger than that at the center thereof.

When inner pincushion distortion is caused by east-west pincushion distortion correction, vertical lines in intermediate portions between the right end and the center and between the left end and the center out of a plurality of vertical lines displayed on the screen are curved inward. In this case, the positions of the pixels in upper and lower parts of the vertical line in the intermediate portion are shifted inward, thereby making it possible to correct the inner pincushion distortion.

The first correction waveform may correspond to the change in the period of time of the read clock signal, and may be set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and the second correction waveform may be set such that the amplitude thereof at the center in the vertical direction of the screen is larger than those at the upper and lower ends thereof.

When inner pincushion distortion is caused by east-west pincushion distortion correction, vertical lines in intermediate portions between the right end and the center and between the left end and the center out of a plurality of vertical lines displayed on the screen are curved inward. In this case, the position of the pixel at the center of the vertical line in the intermediate portion is shifted outward, thereby making it possible to correct the inner pincushion distortion.

The step of generating the read clock signal may comprise the step of generating the read clock signal by a phase-locked loop having a voltage controlled oscillator, the step of generating the distortion correction waveform may further comprise the step of converting the distortion correction waveform into a distortion correction voltage corresponding to the change in the frequency of the read clock signal and outputting the distortion correction voltage, and the step of controlling the frequency of the read clock signal may comprise the step of superimposing the outputted distortion correction voltage on an oscillation frequency control voltage of the voltage controlled oscillator of the phase-locked loop.

In this case, the distortion correction voltage is superimposed on the oscillation frequency control voltage of the voltage controlled oscillator of the phase-locked loop, so that the frequency of the read clock signal is changed. Consequently, the readout period of time of the video signal read out of the storage device is changed, and the positions of the pixels displayed on the screen are shifted on the basis of the video signal, so that the distortion in the image is corrected.

The image distortion correcting method may further comprise the step of adding a correction pulse to the distortion correction voltage in a horizontal blanking interval such that the average of the distortion correction voltage in each horizontal scanning interval of the video signal becomes a predetermined value.

In this case, the average value of the oscillation frequency control voltage of the voltage controlled oscillator in each horizontal scanning interval of the video signal becomes a predetermined value. Accordingly, the average of the frequency of the read clock signal generated by the voltage controlled oscillator becomes constant. In this way, the average of the oscillation frequency control voltage of the voltage controlled oscillator is not changed before and after the superimposition of the distortion correction voltage, so that the operation of the phase-locked loop is not changed.

The step of adding the correction pulse may comprise the step of adding the correction pulse to the distortion correction voltage before the time point where phase comparison of the phase-locked loop is made in the horizontal blanking interval such that the average of the distortion correction voltage becomes a predetermined value for each horizontal scanning interval.

An image distortion correcting apparatus for correcting distortion in an image displayed on a screen on the basis of a video signal according to still another aspect of the present invention comprises storage means for storing the video signal; write clock signal generation means for generating a write clock signal for writing an inputted video signal into the storage means; read clock signal generation means for generating a read clock signal for reading out the video signal stored in the storage means; distortion correction waveform generation means for generating a distortion correction waveform for correcting the distortion in the image by shifting the positions of pixels displayed on the screen on the basis of the video signal; and read clock signal control means for controlling the frequency of the read clock signal generated by the read clock signal generation means on the basis of the distortion correction waveform generated by the distortion correction waveform generation means, and the distortion correction waveform generation means may set the distortion correction waveform such that the amount of shift of the pixel reaches zero at both ends and the center of the image in the horizontal scanning direction.

In the image distortion correcting apparatus according to the present invention, the video signal inputted in response to the write clock signal generated by the write clock signal generation means is written into the storage means, and the video signal stored in the storage means is read out in response to the read clock signal generated by the read clock signal generation means. At this time, the frequency of the read clock signal is controlled by the read clock signal control means on the basis of the distortion correction waveform generated by the distortion correction waveform generation means, so that the readout period of time of the video signal from the storage means is changed. Consequently, the positions of the pixels displayed on the screen are shifted on the basis of the video signal, so that the distortion in the image is corrected.

In this case, the distortion correction waveform is set such that the amount of shift of the pixel reaches zero at both the ends and the center of the image in the horizontal scanning direction. Accordingly, the positions at both the ends and the center of the image are not shifted.

It is thus possible to correct the distortion in the image by changing the read clock signal using the distortion correction waveform without changing a deflection current in a deflection circuit, so that power consumption is not increased. Further, it is possible to correct the distortion in the image by providing the distortion correction waveform generation means and the read clock signal control means without improving the deflection circuit. Accordingly, the circuit configuration is not complicated, thereby not preventing the cost from being reduced.

As described in the foregoing, according to the present invention, the frequency of the read clock signal is controlled on the basis of the distortion correction waveform, so that the readout period of time of the video signal from the storage device or the storage means is changed. Consequently, the positions of the pixels displayed on the screen are shifted on the basis of the video signal, so that the distortion in the image is corrected. In this case, the distortion correction waveform is set such that the amount of shift of the pixel reaches zero at both the ends and the center of the image in the horizontal scanning direction. Accordingly, the positions at both the ends and the center of the image are not shifted.

It is thus possible to correct the distortion in the image by changing the read clock signal using the distortion correction waveform without changing the deflection current in the deflection circuit. Accordingly, the power consumption is not increased. Further, it is possible to correct the distortion in the image by providing the distortion correction waveform generation circuit or the distortion correction waveform generation means and the read clock signal control circuit or the read clock signal control circuit without improving the deflection circuit. Accordingly, the circuit configuration is not complicated, thereby making it possible to reduce the cost.

BRIEF DESCRIPTION OF DRAWINGS

FIG. 10 is a waveform diagram showing examples of a correction waveform in the horizontal scanning period of time based on the change in period of time used for inner pincushion distortion correction using the center of a screen as a basis, a correction waveform in the vertical scanning period of time, and an inner pincushion distortion correction voltage.

FIG. 11 is a waveform diagram showing examples of a correction waveform in the horizontal scanning period of time based on the change in period of time used for inner pincushion distortion correction using upper and lower ends of a screen as a basis, a correction waveform in the vertical scanning period of time, and an inner pincushion distortion correction voltage.

FIG. 12 is a block diagram showing a first example of the configuration of an inner pincushion distortion correction voltage generation circuit shown in FIG. 1.

FIG. 13 is a block diagram showing a second example of the configuration of an inner pincushion distortion correction voltage generation circuit shown in FIG. 1.

FIG. 21 is a waveform diagram showing an example of a correction waveform in the vertical scanning period of time used for inner pincushion distortion correction using positions between the center and upper and lower ends of a vertical line on a screen as a basis.

BEST MODE FOR CARRYING OUT THE INVENTION

Figure 1:
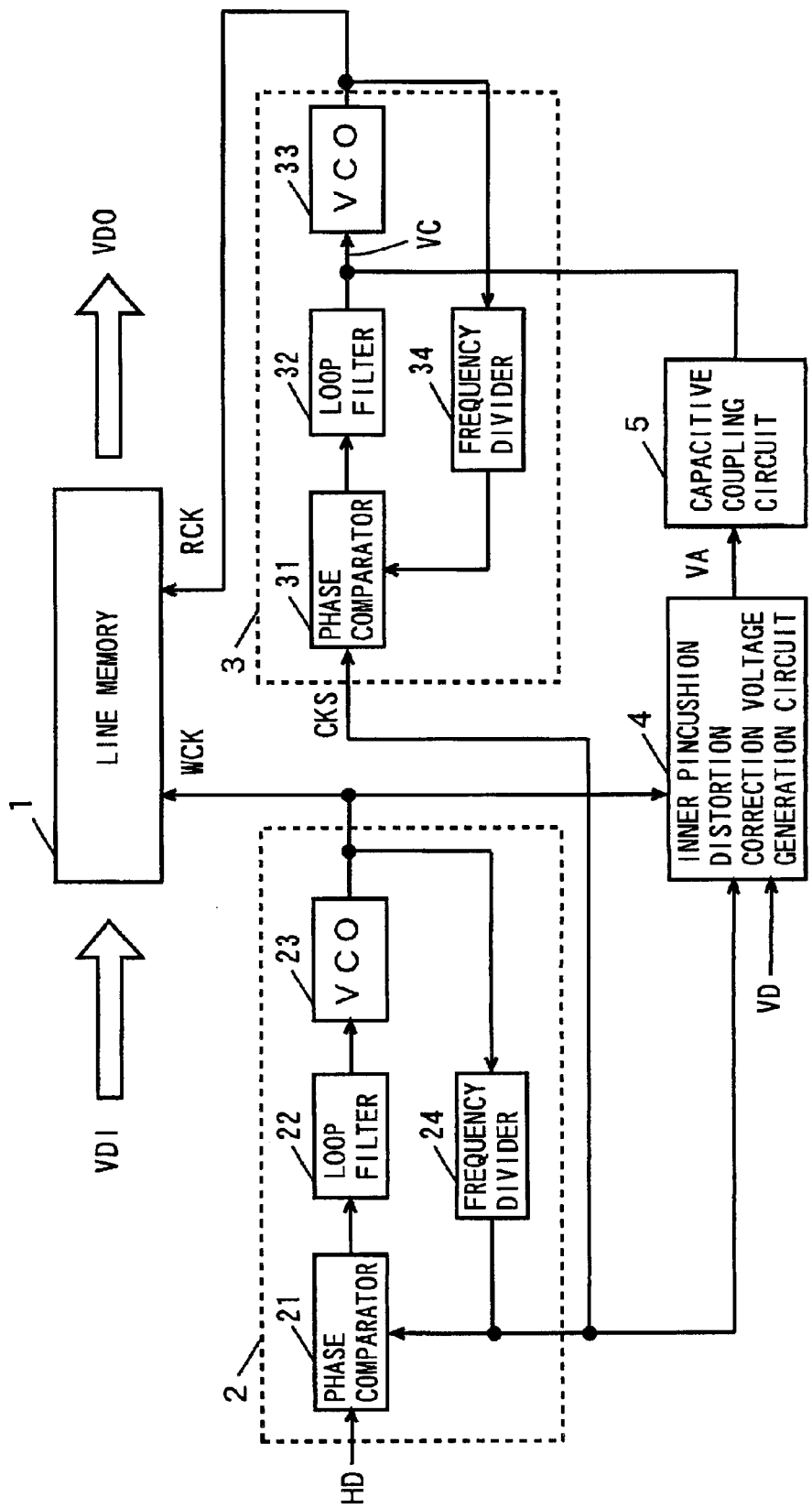
FIG. 1 is a block diagram showing the configuration of an image distortion correcting apparatus according to a first embodiment of the present invention.

FIG. 1 is a block diagram showing the configuration of an image distortion correcting apparatus in a first embodiment of the present invention.

The image distortion correcting apparatus shown in FIG. 1 comprises a line memory 1, a write PLL (Phase-Locked Loop) circuit 2, a readout PLL circuit 3, an inner pincushion distortion correction voltage generation circuit 4, and a capacitive coupling circuit 5. The write PLL circuit 2 comprises a phase comparator 21, a loop filter 22, a VCO (Voltage Controlled Oscillator) 23, and a frequency divider 24. Similarly, the readout PLL circuit 3 comprises a phase comparator 31, a loop filter 32, a VCO 33, and a frequency divider 34.

A horizontal synchronizing signal HD which is synchronized with a video signal VDI is fed to the phase comparator 21 in the write PLL circuit 2. The phase comparator 21 feeds a voltage corresponding to the phase difference between the horizontal synchronizing signal HD and an output signal of the frequency divider 24 to the VCO 23 through the loop filter 22 as a control voltage. The VCO 23 feeds an output signal having a frequency corresponding to a control voltage to the line memory 1, the frequency divider 24, and the inner pincushion distortion correction voltage generation circuit 4 as a write clock signal WCK. The frequency divider 24 frequency-divides the write clock signal WCK, feeds an output signal to the phase comparator 21 as a phase comparison signal with the horizontal synchronizing signal HD, and feeds an output signal to the phase comparator 31 in the readout PLL circuit 3 and the inner pincushion distortion correction voltage generation circuit 4 as a readout reference signal CKS.

The inner pincushion distortion correction voltage generation circuit 4 generates an inner pincushion distortion correction voltage VA on the basis of the write clock signal WCK, the reference signal CKS, and a vertical reference signal VD. The vertical reference signal VD is a signal which is synchronized with a vertical synchronizing signal.

The phase comparator 31 in the readout PLL circuit 3 feeds a voltage corresponding to the phase difference between the reference signal CKS and an output signal of the frequency divider 34 to the loop filter 32. The loop filter 32 smoothes the voltage fed from the phase comparator 31. The capacitive coupling circuit 5 superimposes the inner pincushion distortion correction voltage VA generated by the inner pincushion distortion correction voltage generation circuit 4 on an output voltage of the loop filter 32, and feeds a voltage obtained by the superimposition to the VCO 33 as a control voltage VC. The VCO 33 feeds a read clock signal RCK having a frequency corresponding to the control voltage VC to the line memory 1 and the frequency divider 34. The frequency divider 34 frequency-divides the read clock signal RCK, and feeds an output signal to the phase comparator 31.

The digital video signal VDI is written into the line memory 1 in response to the write clock signal WCK. A digital video signal VDO is read out of the line memory 1 in response to the read clock signal RCK.

In the image distortion correcting apparatus according to the present embodiment, the inner pincushion distortion correction voltage VA is superimposed on the control voltage fed to the VCO 33 in a feedback loop of the readout PLL circuit 3, to modulate the oscillation frequency of the VCO 33 (the frequency of the read clock signal RCK), as described later. Consequently, the readout period of time of the video signal VDO from the line memory 1 is changed, to change the width of each pixel. As a result, the pixels can be shifted in the horizontal direction, thereby making it possible to correct inner pincushion distortion.

In the present embodiment, the line memory 1 corresponds to a storage device or storage means, the write PLL circuit 2 corresponds to a write clock signal generation circuit or write clock signal generation means, the readout PLL circuit 3 corresponds to read clock signal generation means or read clock signal generation means, the inner pincushion distortion correction voltage generation circuit 4 corresponds to a distortion correction waveform generation circuit or distortion correction waveform generation means, and the capacitive coupling circuit 5 corresponds to a distortion correction waveform superimposing circuit or a distortion correction waveform superimposing circuit.

The basic principle of inner pincushion distortion correction in the present embodiment will be described.

Figure 2:
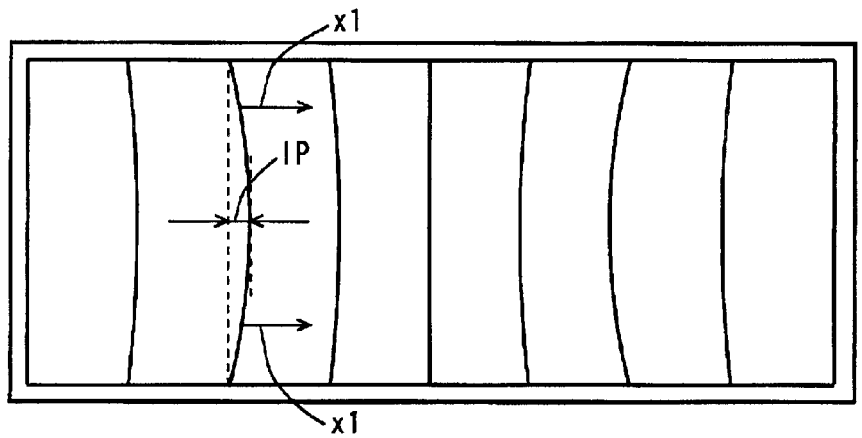
FIG. 2 is a schematic view for explaining inner pincushion distortion.

FIG. 2 is a schematic view for explaining inner pincushion distortion. When vertical lines equally spaced are displayed on a screen in a state where east-west pincushion distortion correction is made by a deflection circuit, the vertical line at the center of the screen and the vertical lines at right and left ends of the screen are straight lines, and the vertical lines to be straight lines are curved inward in intermediate portions between the center and the right end of the screen and between the center and the left end thereof, as shown in FIG. 2. A deviation between the position of each of pixels constituting the vertical line which is to be inherently displayed and the position of each of the pixels constituting the vertical line which is displayed in a curved shape becomes an amount of inner pincushion distortion IP.

The inner pincushion distortion can be corrected by shifting the pixels in upper and lower parts in the vertical direction of the vertical line on the screen inward in the horizontal direction using the center thereof as a basis, as indicated by arrows x1. Conversely, the inner pincushion distortion can be also corrected by shifting the pixel at the center of the vertical line outward in the horizontal direction using the upper and lower ends thereof as a basis.

Description is now made of a case where the pixels in the upper and lower parts in the vertical direction of the vertical line on the screen are shifted inward in the horizontal direction using the center thereof as a basis, to correct the inner pincushion distortion when there is no particular description. Further, scanning shall be performed from the left to the right of the screen (in a direction indicated by the arrows x1).

Figure 3:
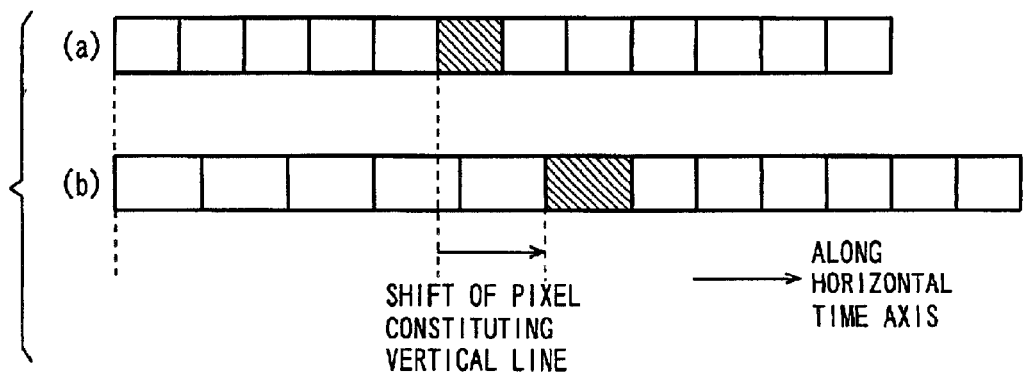
FIG. 3 is a diagram showing an example of inner pincushion distortion correction by the shift of the pixels on a screen.

FIG. 3 is a diagram showing an example of inner pincushion distortion correction by the shift of pixels on a screen. FIG. 3 (*a*) illustrates pixels on one line before the inner pincushion distortion correction, and FIG. 3 (*b*) illustrates the pixels on one line after the inner pincushion distortion correction. The period of time of the read clock signal RCK shown in FIG. 1 corresponds to the width of one pixel.

In FIG. 3, a pixel constituting a vertical line is indicated by hatching. In this case, when the period of time of the read clock signal RCK is increased, the width of the pixel constituting the vertical line is changed, and the position of the pixel is changed along a horizontal time axis, as shown in FIG. 3. The time axis of a video signal is converted into a space axis on a screen of a CRT, so that the position of the pixel is changed in the horizontal direction. At this time, the change in the width of the pixel is offset by deflecting distortion, and the width of the pixel comes close to the width of the pixel in a state where there is no deflecting distortion. In the example shown in FIG. 3, the width and the position are changed with six pixels used as one unit.

Figure 4:
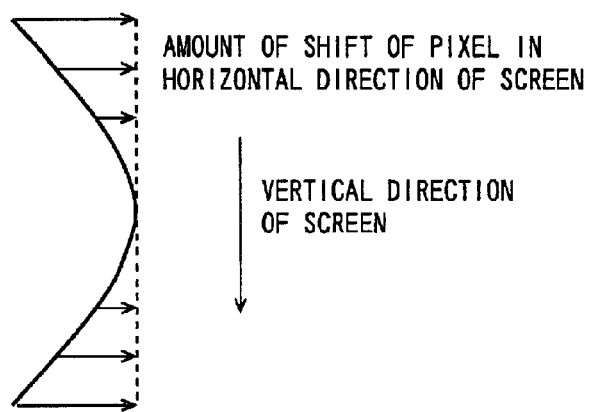
FIG. 4 is a diagram showing the relationship between the amount of shift of the pixels in the horizontal direction of a screen and the positions in the vertical direction of the screen.

FIG. 4 is a diagram showing the relationship between the amount of shift of pixels in the horizontal direction of a screen and the positions in the vertical direction of the screen. As shown in FIG. 2, the vertical lines to be straight lines are curved inward in the intermediate portions between the center of the screen and the right and left ends thereof. Accordingly, the amount of shift of the pixel is the minimum at the center in the vertical direction of the screen, and is increased toward the upper and lower ends of the screen, thereby making it possible to correct the vertical line in a linear shape.

Consequently, inner pincushion distortion is composed of correction at a horizontal rate (in a horizontal scanning period of time) and correction at a vertical rate (in a vertical scanning period of time). That is, the amount of change at a horizontal rate (the amount of shift of the pixel constituting the vertical line) is changed at a vertical rate, thereby making it possible to correct the inner pincushion distortion in the image.

In the image distortion correcting apparatus shown in FIG. 1, the inner pincushion distortion correction voltage VA is superimposed on the control voltage fed to the VCO 33 in the readout PLL circuit 3, to change the frequency of the read clock signal RCK, thereby changing the width and the position of the pixel. The inner pincushion distortion correction voltage VA is obtained by modulating a correction waveform in the horizontal scanning period of time by a correction waveform in the vertical scanning period of time.

Figure 5:
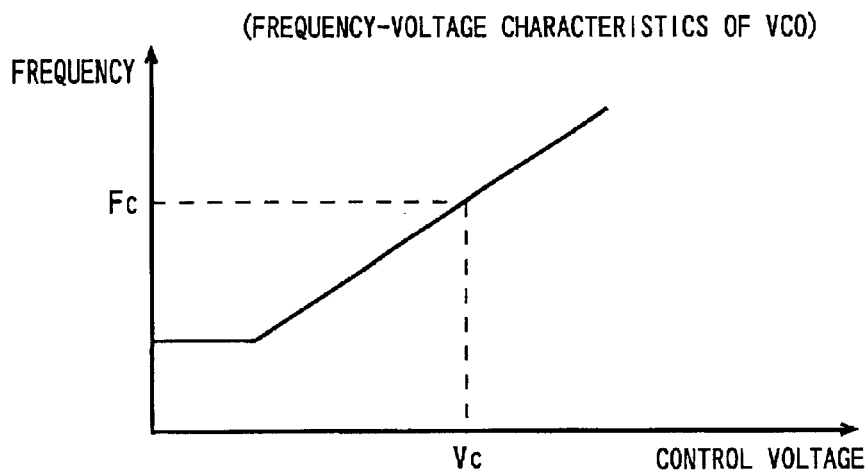
FIG. 5 is a diagram showing an example of the frequency-voltage characteristics of a VCO in a readout PLL circuit shown in FIG. 1.

FIG. 5 is a diagram showing an example of the frequency-voltage characteristics of the VCO 33 in the readout PLL circuit 3 shown in FIG. 1. In FIG. 5, a center voltage Vc is a voltage determined by the feedback loop of the readout PLL circuit 3. When the control voltage VC fed to the VCO 33 is the center voltage Vc, the oscillation frequency becomes a center frequency Fc. Consequently, the control voltage VC fed to the VCO 33 in the readout PLL circuit 3 is changed from the center voltage Vc, thereby making it possible to change the frequency of the read clock signal RCK from the center frequency Fc.

When the control voltage VC is not more than the center voltage Vc, for example, the oscillation frequency of the VCO 33 (the frequency of the read clock signal RCK) is not more than the center frequency Fc, so that the width of one pixel is increased. As a result, on the screen where scanning is performed from the left to the right, the displayed pixels are shifted rightward.

Figure 6:
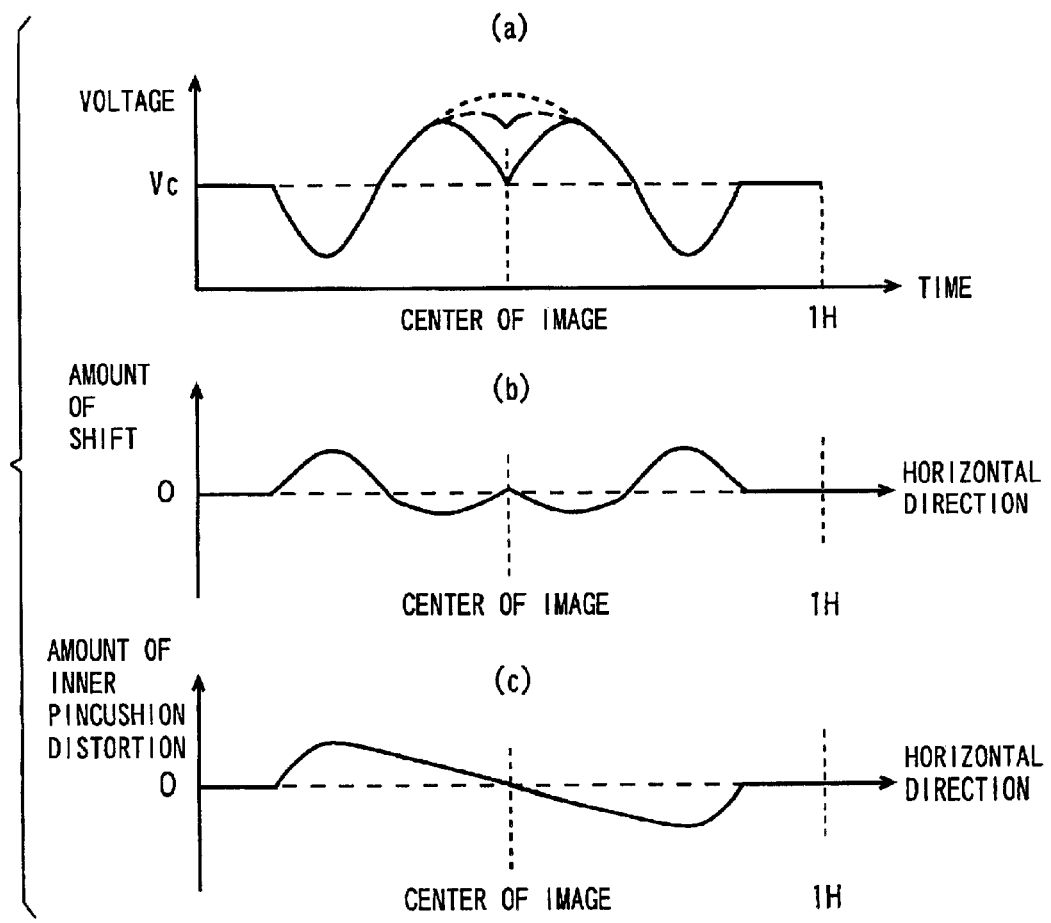
FIG. 6 is a waveform diagram showing a correction waveform in the horizontal scanning period of time based on the change in frequency used for inner pincushion distortion correction using the center of a screen as a basis, a waveform diagram showing the amount of shift of the pixel by the correction waveform in the horizontal scanning period of time, and a diagram showing the amount of inner pincushion distortion.

FIG. 6 (a) is a waveform diagram showing an example of a correction waveform in the horizontal scanning period of time based on the change in frequency, FIG. 6 (b) is a waveform diagram showing an example of the amount of shift of the pixel by the correction waveform in the horizontal scanning period of time, and FIG. 6 (c) is a diagram showing an example of the amount of inner pincushion distortion. In FIG. 6, 1H on the horizontal axis denotes one horizontal scanning interval or one horizontal scanning distance. The amount of shift on the vertical axis indicates the shifting distance of each pixel. At this time, the rightward shift on the screen shall be positive.

The correction waveform in the horizontal scanning period of time based on the change in frequency has a waveform which is changed in correspondence with the frequency of the read clock signal RCK.

In the correction, in a range from a start point (a left end of an image) of a horizontal video period of time in a video signal to the center of an image, the integrated value of the amount of change in the period of time of the read clock signal RCK after correction corresponding to the period of time of the read clock signal RCK before the correction is taken as zero. This corresponds to the fact that the amount of shift of a pixel at the center of the image reaches zero (the center of the image is not shifted).

In a range from a start point (a left end of an image) to an end point (a right end of the image) of a horizontal video period of time in a video signal, the integrated value of the amount of change in the period of time of the read clock signal RCK after correction corresponding to the period of time of the read clock signal RCK before the correction is taken as zero. This corresponds to the fact that the amount of shift of a pixel at the right end of the image reaches zero (a final point of the image is not shifted).

In the above-mentioned description, however, the period of time of the read clock signal RCK shall not be corrected in a horizontal blanking interval.

Consequently, the correction waveform in the horizontal scanning period of time based on the change in frequency becomes the center voltage Vc at the center and the right and left ends of the image, as shown in FIG. 6 (a). In an intermediate portion between the left end and the center of the image, the correction waveform in the horizontal scanning period of time is raised after being lowered to not more than the center voltage Vc, and is lowered to the center voltage Vc after being raised to not less than the center voltage Vc. In an intermediate portion between the center and the right end of the image, the correction waveform in the horizontal scanning period of time is lowered after being raised to not less than the center voltage Vc, and is raised to the center voltage Vc after being lowered to not more than the center voltage Vc. At this time, the amount of shift of the pixel by the correction waveform in the horizontal scanning period of time shown in FIG. 6 (a) is as shown in FIG. 6 (b), and reaches zero at the center and the right and left ends of the image. The pixels are shifted, as shown in FIG. 6 (b), thereby making it possible to correct the inner pincushion distortion as shown in FIG. 6 (c).

Although in the example shown in FIG. 6 (a), the correction waveform in the horizontal scanning period of time based on the change in frequency is the center voltage Vc at the center of the image, it is not limited to the same. The correction waveform in the horizontal scanning period of time based on the change in frequency can be also created such that it is not the center voltage Vc at the center of the image, as indicated by a dotted line or a one-dot and dash line shown in FIG. 6 (a). Description is hereinafter made of a case where the correction waveform in the horizontal scanning period of time based on the change in frequency is the center voltage Vc at the center of the image, as indicated by a solid line in FIG. 6 (a).

Figure 7:
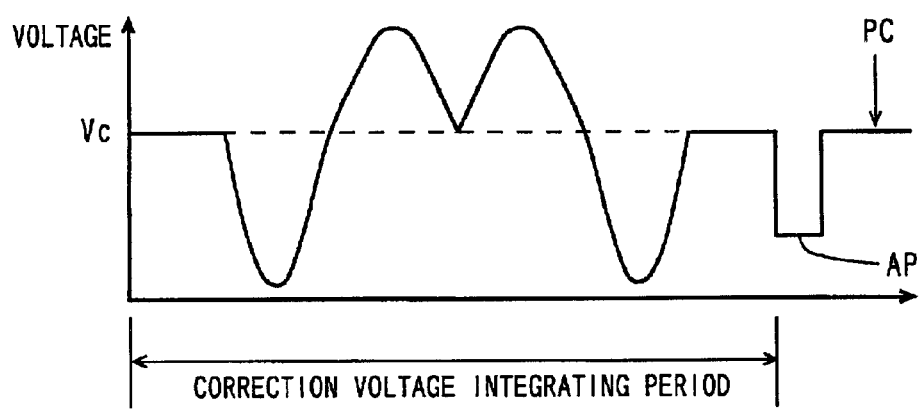
FIG. 7 is a waveform diagram for explaining an example of a DC correction pulse.

FIG. 7 is a waveform diagram for explaining an example of a DC correction pulse. FIG. 7 illustrates a correction waveform in the horizontal scanning period of time based on the change in frequency.

As shown in FIG. 7, a DC correction pulse AP is inserted into a horizontal blanking interval such that a DC component of the correction waveform in the horizontal scanning period of time coincides with the center voltage Vc of the VCO 33 in the readout PLL circuit 3 shown in FIG. 1. The polarity and the level of the DC correction pulse AP are calculated in real time on the basis of the results of integration of the correction waveform in the horizontal scanning period of time within 1H. The DC correction pulse AP is inserted into an arbitrary position ahead of a phase comparison point PC by the phase comparator 31 in the readout PLL circuit 3 and within the horizontal blanking interval.

In this case, the amount of correction to be corrected by the DC correction pulse AP is changed by waveforms above and below the correction waveform in the horizontal scanning period of time with respect to the center voltage Vc. The amount of correction by the DC correction pulse AP is determined by the following equation:

Amount of correction=Σ(correction voltage−Vc)=pulse width× pulse level

Here, Σ(correction voltage−Vc) means that (correction voltage−Vc) is integrated on the time axis. When the pulse level of the DC correction pulse AP is limited by a control voltage or the like which is allowed to the VCO 33, the amount of correction must be ensured by the pulse width. Therefore, the pulse width of the DC correction pulse AP is arbitrarily settable. The larger the pulse width of the DC correction pulse AP is, the larger an error in the amount of correction is. Therefore, it is preferable that the pulse width is made as narrow as possible.

FIG. 7 also describes a case where the DC correction pulse AP is inserted into the correction waveform in the horizontal scanning period of time based on the change in frequency. Also in a correction waveform in the horizontal scanning period of time based on the change in period of time, described later, however, the same DC correction pulse is inserted into an arbitrary position ahead of the phase comparison point by the phase comparator 31 in the readout PLL circuit 3 and within the horizontal blanking interval. The correction waveform in the horizontal scanning period of time based on the change in period of time has a waveform which is changed in correspondence with the period of time of the read clock signal RCK.

Figure 8:
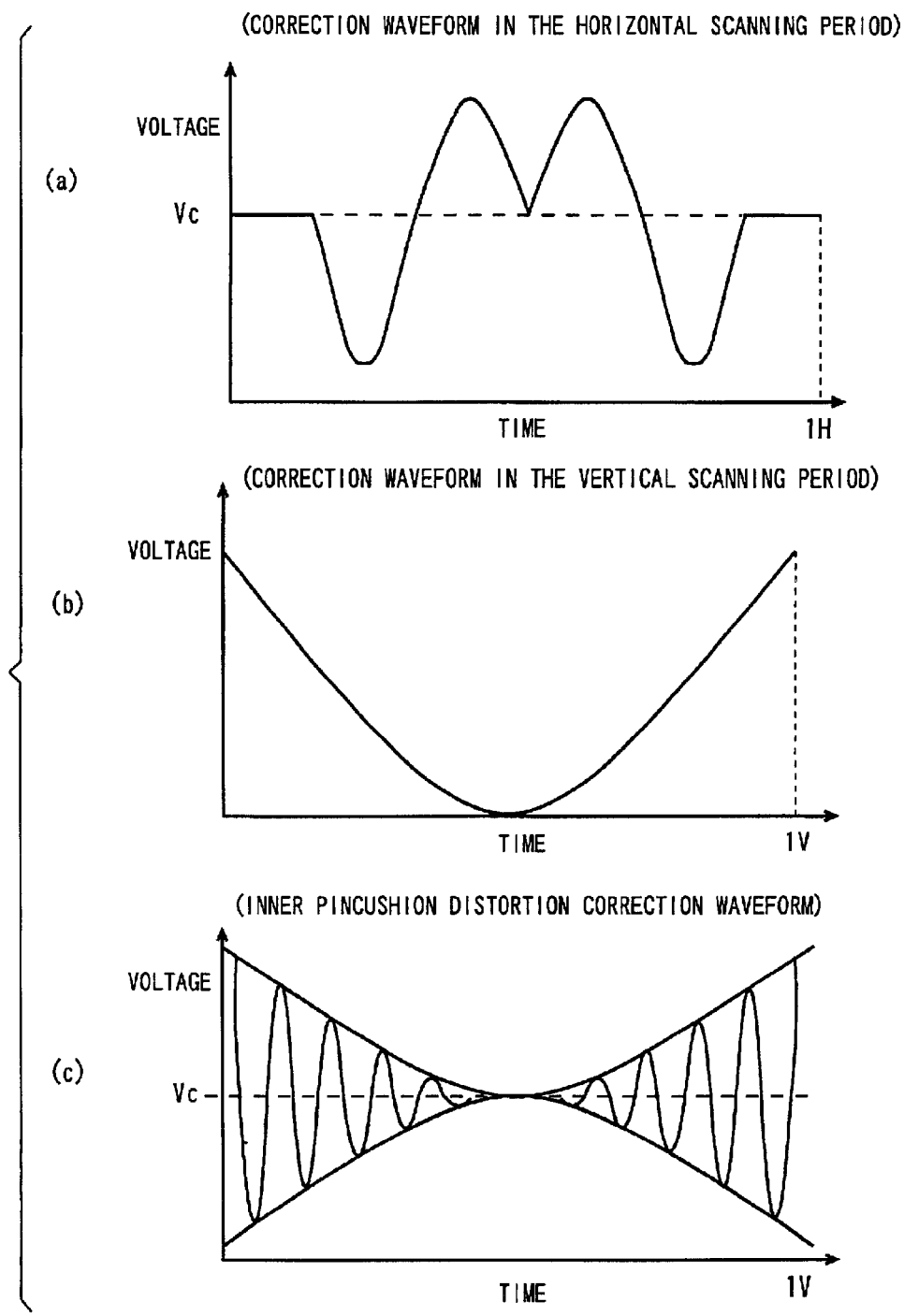
FIG. 8 is a waveform diagram showing examples of a correction waveform in the horizontal scanning period of time based on the change in frequency used for inner pincushion distortion correction using the center of a screen as a basis, a correction waveform in the vertical scanning period of time, and an inner pincushion distortion correction voltage.

FIG. 8 (a) is a waveform diagram showing an example of a correction waveform in the horizontal scanning period of time based on the change in frequency, FIG. 8 (b) is a waveform diagram showing an example of a correction waveform in the vertical scanning period of time, and FIG. 8 (c) is a waveform diagram showing an example of an inner pincushion distortion correction waveform based on the change in frequency. FIG. 8 illustrates a case where pixels in upper and lower parts of a vertical line on a screen are shifted using the center thereof as a basis, to correct inner pincushion distortion. FIG. 8 does not illustrate the DC correction pulse AP shown in FIG. 7. In FIG. 8 (b), 1V indicates one vertical scanning interval.

The correction waveform in the horizontal scanning period of time based on the change in frequency is changed in 1H, as shown in FIG. 8 (a), and the correction waveform in the vertical scanning period of time is changed in 1V, as shown in FIG. 8 (b). The correction waveform in the horizontal scanning period of time shown in FIG. 8 (a) is modulated by the correction waveform in the vertical scanning period of time shown in FIG. 8 (b), thereby obtaining the inner pincushion distortion correction waveform based on the change in frequency shown in FIG. 8 (c).

FIG. 8 (c) schematically illustrates the inner pincushion distortion correction waveform, or accurately one obtained by amplitude-modulating the correction waveform in the horizontal scanning period of time shown in FIG. 8 (a) by the correction waveform in the vertical scanning period of time shown in FIG. 8 (b).

In the vertical blanking interval, the correction waveform in the vertical scanning period of time shown in FIG. 8 (b) may be a predetermined value. Further, the correction waveform in the horizontal scanning period of time shown in FIG. 8 (a) may be a predetermined value in the vicinity of the center of the screen.

Figure 9:
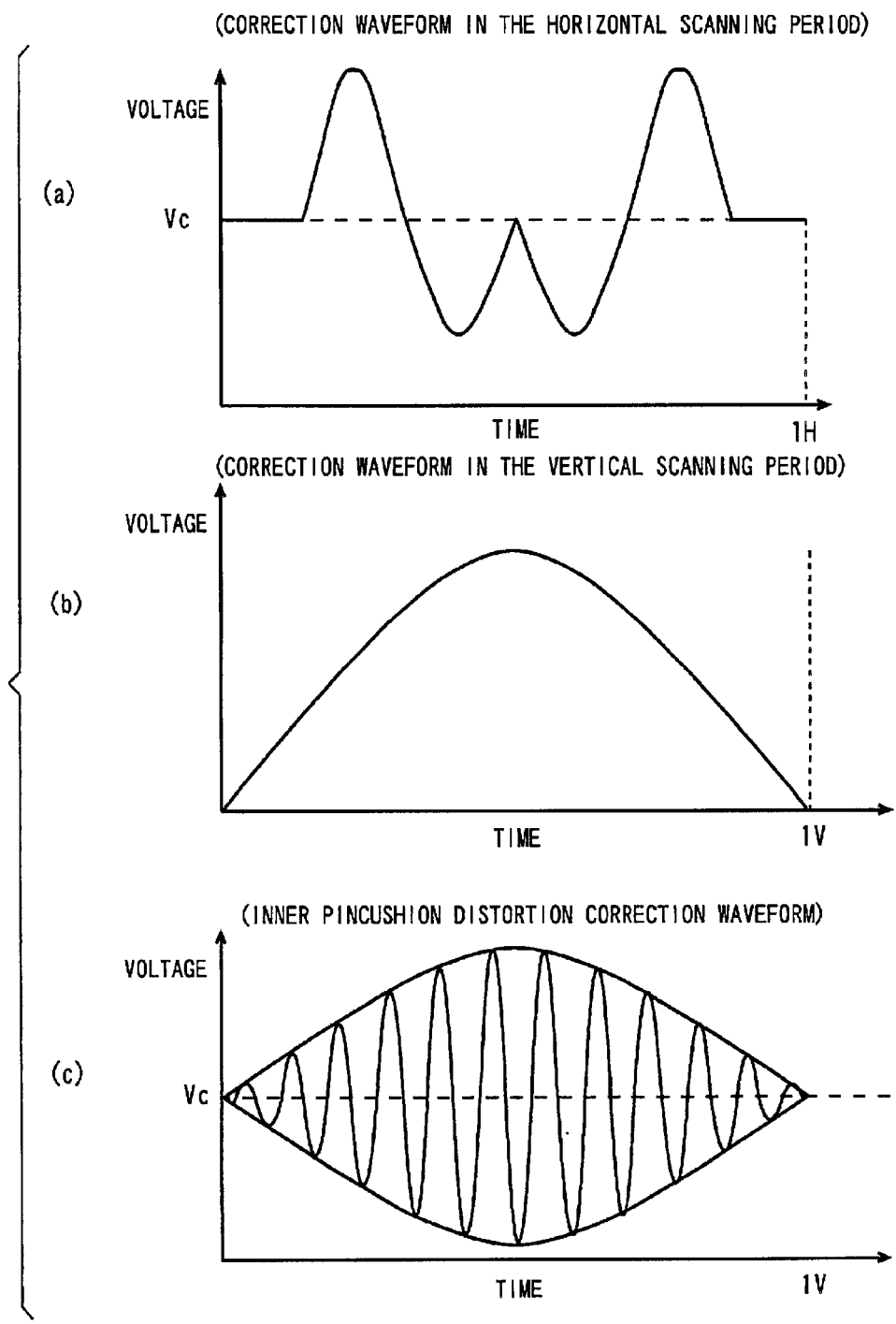
FIG. 9 is a waveform diagram showing examples of a correction waveform in the horizontal scanning period of time based on the change in frequency used for inner pincushion distortion correction using upper and lower ends of a screen as a basis, a correction waveform in the vertical scanning period of time, and an inner pincushion distortion correction voltage.

When the center of the vertical line on the screen is shifted using the upper and lower ends thereof as a basis, to correct the inner pincushion distortion, the correction waveform in the horizontal scanning period of time based on the change in frequency is a waveform obtained by turning the waveform shown in FIG. 8 (a) upside down with respect to the center voltage Vc, as shown in FIG. 9 (a). The correction waveform in the vertical scanning period of time is the maximum at its center, and is decreased toward both its ends, as shown in FIG. 9 (b). Further, the inner pincushion distortion correction waveform based on the change in frequency becomes a waveform which expands at its center and converges toward both its ends, as shown in FIG. 9 (c).

FIG. 9 (c) schematically illustrates the inner pincushion distortion correction waveform, or accurately one obtained by amplitude-modulating the correction waveform in the vertical scanning period of time shown in FIG. 9 (a) by the correction waveform in the vertical scanning period of time shown in FIG. 9 (b).

In the vertical blanking interval, the correction waveform in the vertical scanning period of time shown in FIG. 9 (b) may be a predetermined value. Further, the correction waveform in the horizontal scanning period of time shown in FIG. 9 (a) may be a predetermined value in the vicinity of the center of the screen.

FIG. 10 (a) is a waveform diagram showing an example of a correction waveform in the horizontal scanning period of time based on the change in period of time, FIG. 10 (b) is a waveform diagram showing an example of a correction waveform in the vertical scanning period of time, and FIG. 10 (c) is a waveform diagram showing an example of an inner pincushion distortion correction waveform based on the change in period of time. FIG. 10 illustrates a case where pixels in upper and lower parts of a vertical line on a screen are shifted using the center thereof as a basis, to correct inner pincushion distortion. However, FIG. 10 does not illustrate the DC correction pulse AP shown in FIG. 7.

The correction waveform in the horizontal scanning period of time is changed in 1H, as shown in FIG. 10 (a), and the correction waveform in the vertical scanning period of time is changed in 1V, as shown in FIG. 10 (b). The correction waveform in the horizontal scanning period of time shown in FIG. 10 (a) is modulated by the correction waveform in the vertical scanning period of time shown in FIG. 10 (b), thereby obtaining the inner pincushion distortion correction waveform based on the change in period of time shown in FIG. 10 (c).

FIG. 10 (c) schematically illustrates the inner pincushion distortion correction waveform, or accurately one obtained by amplitude-modulating the correction waveform in the horizontal scanning period of time shown in FIG. 10 (a) by the correction waveform in the vertical scanning period of time shown in FIG. 10 (b).

In a vertical blanking interval, the correction waveform in the vertical scanning period of time shown in FIG. 10 (b) may be a predetermined value. Further, the correction waveform in the horizontal scanning period of time shown in FIG. 10 (a) may be a predetermined value in the vicinity of the center of the screen.

When the center of the vertical line on the screen is shifted using upper and lower ends thereof as a basis, to correct the inner pincushion distortion, the correction waveform in the horizontal scanning period of time based on the change in period of time is a waveform obtained by turning the waveform shown in FIG. 10 (a) upside down with respect to the center voltage Vc, as shown in FIG. 11 (a). The correction waveform in the vertical scanning period of time is the maximum at its center, and is decreased toward both its ends, as shown in FIG. 11(b). Further, the inner pincushion distortion correction waveform based on the change in period of time is a waveform which expands at its center and converges toward both its ends, as shown in FIG. 11 (c).

FIG. 11 (c) schematically illustrates the inner pincushion distortion correction waveform, or accurately one obtained by amplitude-modulating the correction waveform in the horizontal scanning period of time shown in FIG. 11 (a) by the correction waveform in the vertical scanning period of time shown in FIG. 11 (b).

In the vertical blanking interval, the correction waveform in the vertical scanning period of time shown in FIG. 11 (b) may be a predetermined value. Further, the correction waveform in the horizontal scanning period of time shown in FIG. 11 (a) may be a predetermined value in the vicinity of the center of the screen.

When the correction waveform in the horizontal scanning period of time based on the change in period of time shown in FIGS. 10 (a) or FIG. 11 (a) is used, the inner pincushion distortion correction waveform based on the change in period of time is converted into an inner pincushion distortion correction waveform based on the change in frequency, as described later.

Although in the examples shown in FIGS. 8 to 11, a case where the inner pincushion distortion is corrected by shifting the upper and lower parts of the vertical line on the screen using the center thereof as a basis and a case where the inner pincushion distortion is corrected by shifting the center of the screen using the upper and lower ends thereof as a basis are described, the inner pincushion distortion may be corrected using an arbitrary position of the vertical line on the screen as a basis by shifting the other part thereof. In the case, the correction waveform in the vertical scanning period of time shown in FIG. 8, 9, 10 or 11 is shifted in the vertical direction such that the voltage reaches zero in a time period corresponding to a portion to be the basis on the screen, and has a shape folded upward with a portion where the voltage reaches zero used as its boundary, as shown in FIG. 21.

FIG. 12 is a block diagram showing a first example of the configuration of the inner pincushion distortion correction voltage generation circuit 4 shown in FIG. 1.

The inner pincushion distortion correction voltage generation circuit 4 shown in FIG. 12 comprises a horizontal rate correction waveform circuit 41, a vertical rate correction waveform circuit 42, a multiplier 43, and a DC correction pulse superimposing circuit 44.

The horizontal rate correction waveform circuit 41 starts data processing using a reference signal CKS as a basis, and generates a correction waveform in the horizontal scanning period of time VHD based on the change in frequency shown in FIG. 8 (a) in synchronization with a write clock signal WCK. A pulse of the write clock signal WCK is the minimum unit for data processing. In this case, the correction waveform in the horizontal scanning period of time VHD corresponds to the change in the frequency of a read clock signal RCK generated by the VCO 33 in the readout PLL circuit 3. The vertical rate correction waveform circuit 42 starts data processing using a vertical reference signal VD as a basis, and generates a correction waveform in the vertical scanning period of time VVD shown in FIG. 8 (b) in synchronization with a reference signal CK and the write clock signal WCK.

The multiplier 43 multiples the correction waveform in the horizontal scanning period of time VHD generated by the horizontal rate correction waveform circuit 41 and the correction waveform in the vertical scanning period of time VVD generated by the vertical rate correction waveform circuit 42, to output an inner pincushion distortion correction waveform VAD based on the change in frequency shown in FIG. 8 (c). The DC correction pulse superimposing circuit 44 superimposes a DC correction pulse on the inner pincushion distortion correction waveform VAD outputted from the multiplier 43, to output an inner pincushion distortion correction voltage VA. In this case, inner pincushion distortion is corrected by shifting pixels in upper and lower parts of a vertical line on a screen using the center thereof as a basis.

The horizontal rate correction waveform circuit 41 may generate the correction waveform in the horizontal scanning period of time based on the change in frequency shown in FIG. 9 (a), the vertical rate correction waveform circuit 42 generates the correction waveform in the vertical scanning period of time shown in FIG. 9 (b), and the multiplier 43 may generate the inner pincushion distortion correction waveform based on the change in frequency shown in FIG. 9 (c).

In this case, the inner pincushion distortion is corrected by shifting the pixel at the center of the vertical line on the screen using the upper and lower ends thereof as a basis.

In this example, the horizontal rate correction waveform circuit 41 corresponds to a first correction waveform generation circuit, the vertical rate correction waveform circuit 42 corresponds to a second correction waveform generation circuit, the multiplier 43 corresponds to a modulation circuit or a multiplication circuit, and the DC correction pulse superimposing circuit 44 corresponds to a correction pulse addition circuit.

Although in the example shown in FIG. 12, processing in the digital signal is described, parts or all of circuit blocks can be also performed by processing in an analog signal. In the case of the processing in the analog signal, the write clock signal WCK is not required. Only the reference signal CKS is inputted to the horizontal rate correction waveform circuit 41, and only the vertical reference signal VD is inputted to the vertical rate correction waveform circuit 42.

FIG. 13 is a block diagram showing a second example of the configuration of the inner pincushion distortion correction voltage generation circuit 4 shown in FIG. 1.

The inner pincushion distortion correction voltage generation circuit 4 shown in FIG. 13 comprises a horizontal rate correction waveform circuit 41, a vertical rate correction waveform circuit 42, a variable gain amplifier 46, and a DC correction pulse superimposing circuit 44.

The horizontal rate correction waveform circuit 41 starts data processing using a reference signal CKS as a basis, and generates a correction waveform in the horizontal scanning period of time VHD based on the change in frequency shown in FIG. 8 (a) in synchronization with a write clock signal WCK. A pulse of the write clock signal WCK is the minimum unit for data processing. In this case, the correction waveform in the horizontal scanning period of time VHD corresponds to the change in the frequency of a read clock signal RCK generated by the VCO 33 in the readout PLL circuit 3. The vertical rate correction waveform circuit 42 starts data processing using the vertical reference signal VD as a basis, and generates a correction waveform in the vertical scanning period of time VVD shown in FIG. 8 (b) in synchronization with a reference signal CK and the write clock signal WCK. Consequently, the amplifier 46 outputs an inner pincushion distortion correction waveform VAD based on the change in frequency shown in FIG. 8 (c).

The DC correction pulse superimposing circuit 44 superimposes a DC correction pulse on the inner pincushion distortion correction waveform VAD outputted from the multiplier 43, to output an inner pincushion distortion correction voltage VA. In this case, inner pincushion distortion is corrected by shifting pixels in upper and lower parts of a vertical line on a screen using the center thereof as a basis.

The horizontal rate correction waveform circuit 41 may generate the correction waveform in the horizontal scanning period of time based on the change in frequency shown in FIG. 9 (a), the vertical rate correction waveform circuit 42 may generate the correction waveform in the vertical scanning period of time shown in FIG. 9 (b), and the amplifier 46 may generate the inner pincushion distortion correction waveform based on the change in frequency shown in FIG. 9 (c).

In this case, the inner pincushion distortion is corrected by shifting the pixel at the center of the vertical line on the screen using the upper and lower ends thereof as a basis.

In this example, the horizontal rate correction waveform circuit 41 corresponds to a first correction waveform generation circuit, the vertical rate correction waveform circuit 42 corresponds to a second correction waveform generation circuit, the amplifier 46 corresponds to a modulation circuit or an amplification circuit, and the DC correction pulse superimposing circuit 44 corresponds to a correction pulse addition circuit.

Although in the example shown in FIG. 13, processing in the digital signal is described, parts or all of circuit blocks can be also performed by processing in an analog signal. In the case of the processing in the analog signal, the write clock signal WCK is not required. Only the reference signal CKS is inputted to the horizontal rate correction waveform circuit 41, and only the vertical reference signal VD is inputted to the vertical rate correction waveform circuit 42.

Figure 14:
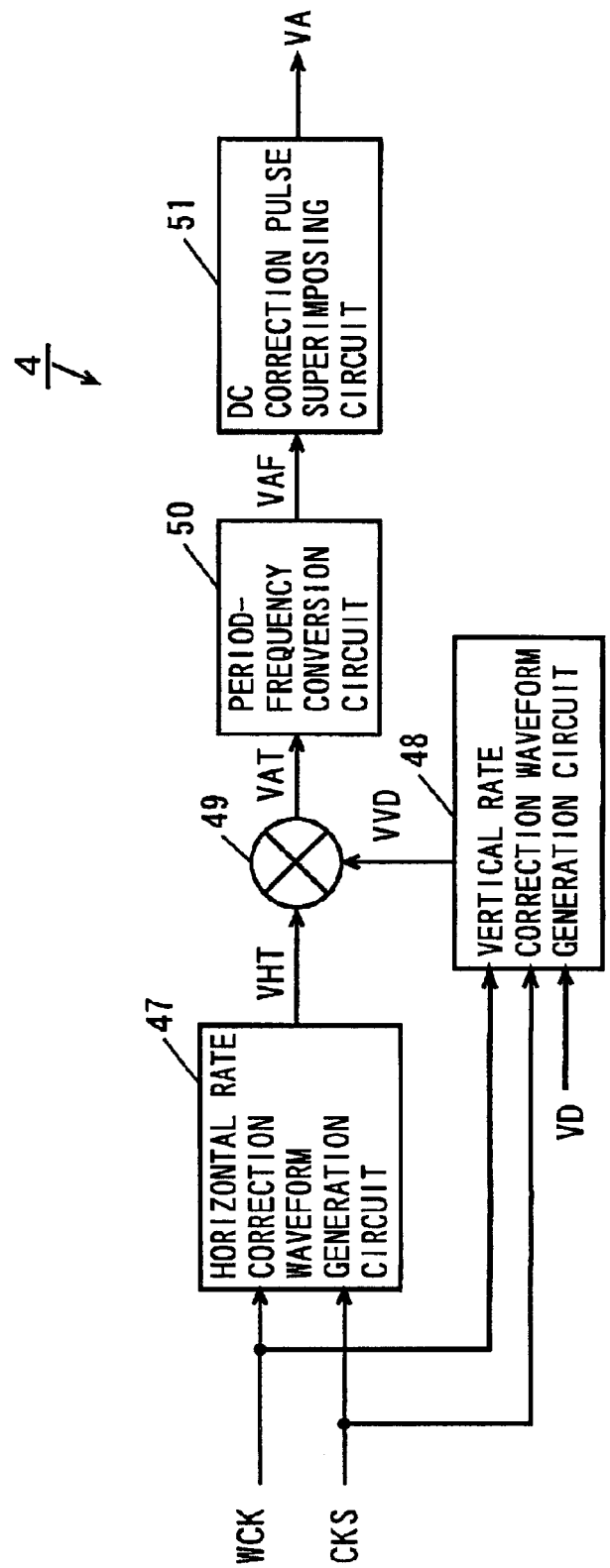
FIG. 14 is a block diagram showing a third example of the configuration of an inner pincushion distortion correction voltage generation circuit shown in FIG. 1.

FIG. 14 is a block diagram showing a third example of the configuration of the inner pincushion distortion correction voltage generation circuit 4 shown in FIG. 1.

The inner pincushion distortion correction voltage generation circuit 4 shown in FIG. 14 comprises a horizontal rate correction waveform circuit 47, a vertical rate correction waveform circuit 48, a multiplier 49, a period-frequency conversion circuit (circuit for converting period of time to frequency) 50, and a DC correction pulse superimposing circuit 51.

The horizontal rate correction waveform circuit 47 starts data processing using a reference signal CKS as a basis, and generates a correction waveform in the horizontal scanning period of time VHT based on the change in period of time shown in FIG. 10 (a) in synchronization with a write clock signal WCK. A pulse of the write clock signal WCK is the minimum unit for data processing. The correction waveform in the horizontal scanning period of time VHD corresponds to the change in the period of time of a read clock signal RCK generated by the VCO 33 in the readout PLL circuit 3. The vertical rate correction waveform circuit 48 starts data processing using a vertical reference signal VD as a basis, and generates a correction waveform in the vertical scanning period of time VVD shown in FIG. 10 (b) in synchronization with a reference signal CK and the write clock signal WCK.

The multiplier 49 multiples the correction waveform in the horizontal scanning period of time VHT generated by the horizontal rate correction waveform circuit 47 and the correction waveform in the vertical scanning period of time VVD generated by the vertical rate correction waveform circuit 48, to output an inner pincushion distortion correction waveform VAT based on the change in period of time shown in FIG. 10 (c).

The period-frequency conversion circuit 50 converts the inner pincushion distortion correction waveform VAT based on the change in period of time into an inner pincushion distortion correction waveform VAF based on the change in frequency. The DC correction pulse superimposing circuit 51 superimposes the DC correction pulse on the inner pincushion distortion correction waveform VAF based on the change in frequency obtained by the period-frequency conversion circuit 50, to output an inner pincushion distortion correction voltage VA. In this case, inner pincushion distortion is corrected by shifting pixels in upper and lower parts of a vertical line on a screen using the center thereof as a basis.

The horizontal rate correction waveform circuit 47 may generate the correction waveform in the horizontal scanning period of time based on the change in frequency shown in FIG. 11 (a), the vertical rate correction waveform circuit 48 may generate the correction waveform in the vertical scanning period of time shown in FIG. 11 (b), and the multiplier 49 may generate the inner pincushion distortion correction waveform based on the change in period of time shown in FIG. 11 (c).

In this case, the inner pincushion distortion is corrected by shifting the pixel at the center of the vertical line on the screen using upper and lower ends thereof as a basis.

In this example, the horizontal rate correction waveform circuit 47 corresponds to a first correction waveform generation circuit, the vertical rate correction waveform circuit 48 corresponds to a second correction waveform generation circuit, the multiplier 49 corresponds to a modulation circuit and a multiplication circuit, and the DC correction pulse superimposing circuit 51 corresponds to a correction pulse addition circuit.

Although processing in the digital signal is described in FIG. 14, parts or all of circuit blocks can be also performed by processing in an analog signal. In the case of the processing in the analog signal, the write clock signal WCK is not required. Only the reference signal CKS is inputted to the horizontal rate correction waveform circuit 47, and only the vertical reference signal VD is inputted to the vertical rate correction waveform circuit 48. In the example shown in FIG. 14, the multiplier 49 may be replaced with an amplifier, as in the example shown in FIG. 13.

In the inner pincushion distortion correction voltage generation circuit 4 shown in FIG. 14, the correction waveform in the horizontal scanning period of time VHT based on the change in period generated by the horizontal rate correction waveform circuit 47 corresponds to the change in the period of time of the read clock signal RCK generated by the VCO 33 in the readout PLL circuit 3, and the period of time is proportional to the amount of shift of the pixels. When the correction waveform in the horizontal scanning period of time VHT is modulated by the correction waveform in the vertical scanning period of time VVD, to obtain the inner pincushion distortion correction voltage VA in each horizontal scanning line, therefore, the amount of inner pincushion distortion and the amount of correction by the inner pincushion distortion correction voltage VA are equal to each other in all horizontal scanning lines, thereby making it possible to accurately correct the inner pincushion distortion over the whole of the screen.

Contrary to this, the correction waveform in the horizontal scanning period of time VHD based on the change in frequency generated by the horizontal rate correction waveform circuit 41 shown in FIGS. 12 and 13 corresponds to the frequency of the read clock signal RCK generated by the VCO 33 in the readout PLL circuit 3, and the frequency is inversely proportional to the amount of shift of the pixels. When the correction waveform in the horizontal scanning period of time VHD is modulated by the correction waveform in the vertical scanning period of time VVD, to obtain the inner pincushion distortion correction voltage VA in each horizontal scanning line, therefore, an error slightly occurs between the amount of inner pincushion distortion and the amount of correction by the inner pincushion distortion correction voltage VA depending on the horizontal scanning line.

When the inner pincushion distortion correction voltage generation circuit 4 shown in FIG. 14 is used, therefore, it is possible to further increase the image quality. On the other hand, when the inner pincushion distortion correction voltage generation circuit 4 shown in FIGS. 12 and 13 is used, it is possible to reduce the circuit scale and reduce the cost.

The horizontal rate correction waveform circuits 41 and 47 and the vertical rate correction waveform circuit 42 and 48 can be constituted by memories and Digital to analog converters. Alternatively, they can be also constituted by waveform generation circuits using a waveform generation function and Digital to analog converters. The waveform generation circuit can be realized by hardware using a logical circuit or the like or software using a microcomputer or the like. The horizontal rate correction waveform circuits 41 and 47 or the vertical rate correction waveform circuits 42 and 48 can be also realized by combining the constituent elements.

When the inner pincushion distortion correction voltage generation circuit 4 is realized by digital processing, the horizontal rate correction waveform circuits 41 and 47 and the vertical rate correction waveform circuits 42 and 48 can be constituted by memories, or can be also constituted by waveform generation circuits using a waveform generation function. Also in this case, the waveform generation circuit can be realized by hardware using a logical circuit or the like or software using a microcomputer or the like. The horizontal rate correction waveform circuits 41 and 47 and the vertical rate correction waveform circuits 42 and 48 can be realized by combining the constituent elements.

Figure 15:
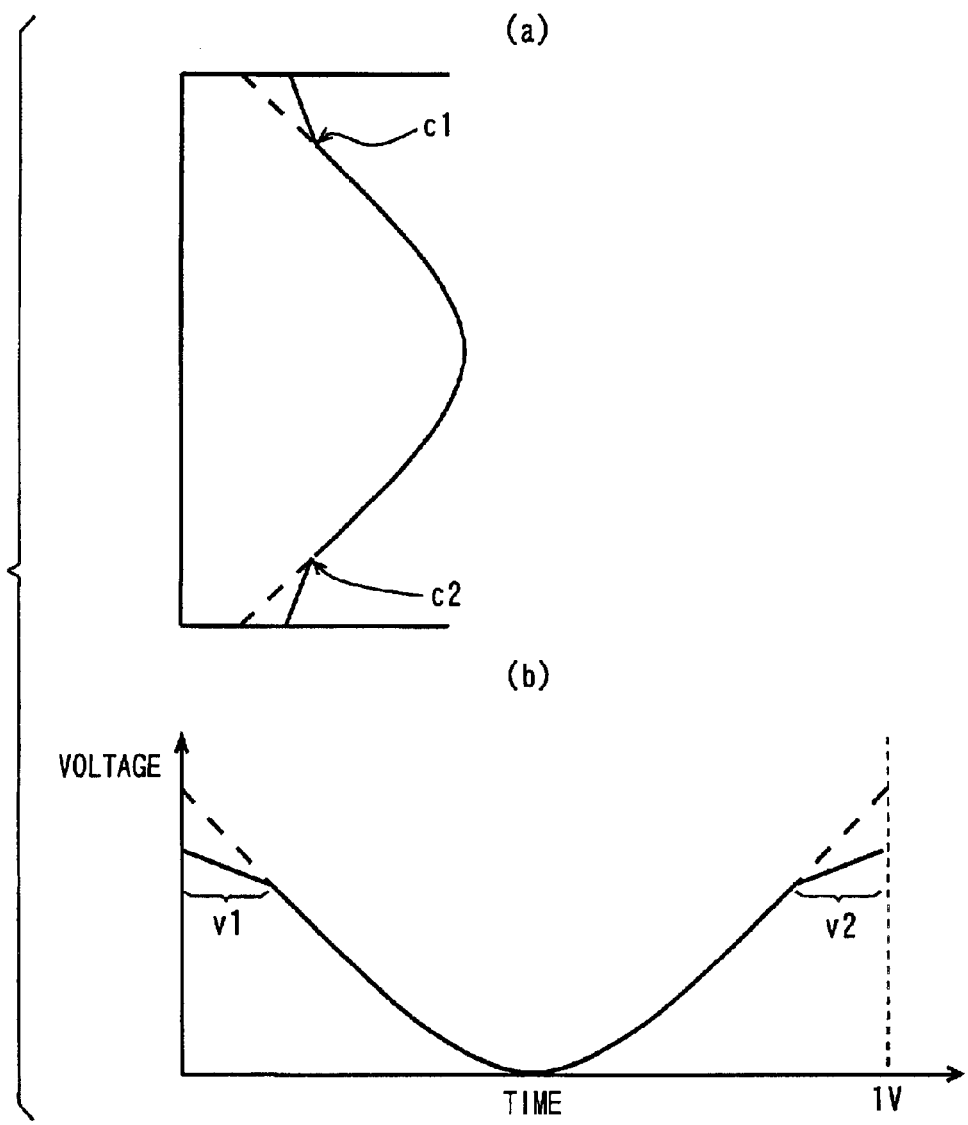
FIG. 15 is a diagram showing an example of the correction of inflection points in upper and lower parts of a screen.

FIG. 15 is a diagram showing an example of correction of inflection points in upper and lower parts of a screen, where 15 (a) indicates a vertical line having inner pincushion distortion on a screen of a CRT, and 15 (b) indicates a correction waveform in the vertical scanning period of time for correcting the inner pincushion distortion shown in FIG. 15 (a).

As shown in FIG. 15 (a), the vertical line having the inner pincushion distortion has inflection points c1 and c2 in its upper and lower parts, and the amount of change in the distortion differs with the infection points c1 and c2 used as boundaries. The inflection points c1 and c2 occur by forming vertical lines at both ends of the screen into straight lines by distortion correction such as east-west pincushion distortion correction.

The inner pincushion distortion correction is made by amplitude-modulating the correction waveform in the horizontal scanning period of time by the correction waveform in the vertical scanning period of time. Therefore, the slope of the correction waveform in the vertical scanning period of time must be made gentle in a first portion v1 and a last portion v2 in correspondence with the inflection points c1 and c2, as shown in FIG. 15 (b). FIG. 15 shows a case where the slope is made gentle. However, there is a case where the slope is strengthened depending on the inflection points. Therefore, the slope is made variable.

In order to make the slope of the correction waveform in the vertical scanning period of time variable, the vertical rate correction waveform circuits 42 and 48 are constituted as follows.

The vertical rate correction waveform circuits 42 and 48 can be constituted by memories. In this case, data representing a portion whose slope is changed in data representing the correction waveform in the vertical scanning period of time which is stored in the memory is rewritten.

The vertical rate correction waveform circuits 42 and 48 can be also constituted by waveform generation circuits using a waveform generation function. When the waveform generation circuit is realized by hardware, function parameters designed so as to be variable are switched. When the waveform generation circuit is realized by software, parameters of the waveform generation function are switched by the software. The waveform generation function itself may be switched by the software.

Figure 16:
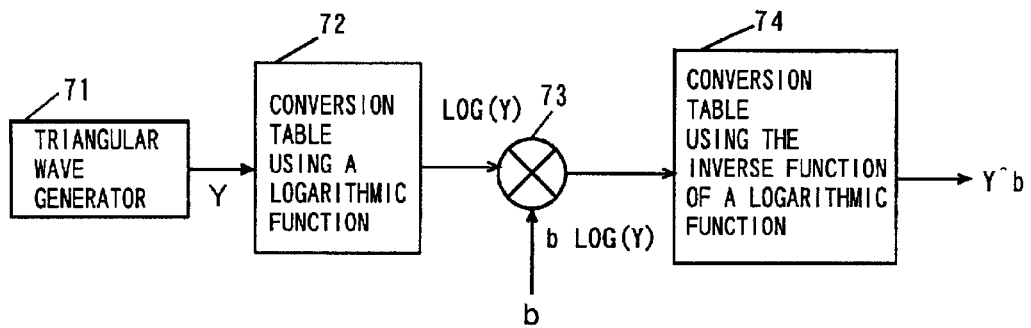
FIG. 16 is a block diagram showing an example of the configuration of a vertical rate correction waveform circuit.

FIG. 16 is a block diagram showing an example of the configuration of the vertical rate correction waveform circuit. The vertical rate correction waveform circuit shown in FIG. 16 comprises a triangular wave generator 71, an Conversion table using a logarithmic function 72, a multiplier 73, and an conversion table using the inverse function of a logarithmic function 74.

When a straight line generated by the triangular wave generator 71 is taken as Y, and the straight line Y is fed to the Conversion table using a logarithmic function 72, an output of the Conversion table using a logarithmic function 72 is LOG(Y).

When the multiplier 73 multiples the output LOG(Y) of the Conversion table using a logarithmic function 72 by b, an output of the multiplier 73 is bLOG(Y), where b is a coefficient.

When the output bLOG(Y) of the multiplier 73 is fed to the conversion table using the inverse function of a logarithmic function 74, an output of the conversion table using the inverse function of a logarithmic function 74 is expressed by the following equation. "^" indicates power.

$$10^{\wedge}(bLOG(Y)) = 10^{\wedge}[LOG(Y^{\wedge}b)] = Y^{\wedge}b$$

Accordingly, a parabolic waveform Y^b which is the b-th power of the straight line Y can be produced. The parabolic waveform is the correction waveform in the vertical scanning period of time.

Figure 17:
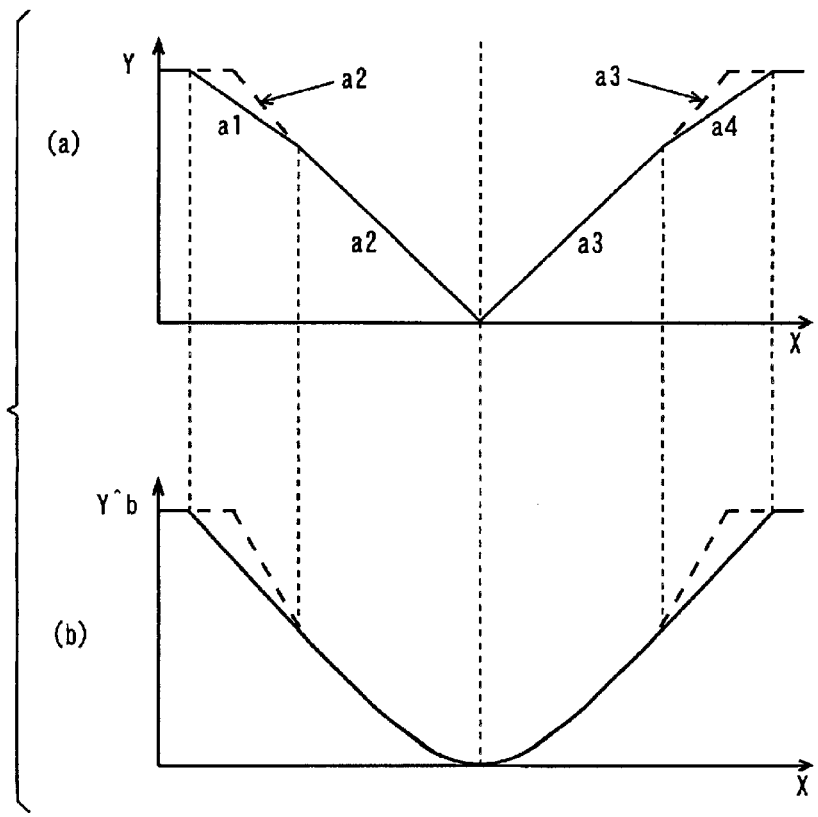
FIG. 17 is a diagram showing examples of a waveform generated by a triangular wave generator shown in FIG. 16 and a waveform outputted by an conversion table using the inverse function of a logarithmic function shown in FIG. 16.

FIG. 17 (a) is a diagram showing an example of a waveform generated by the triangular wave generator 71 shown in FIG. 16, and FIG. 17 (b) is a diagram showing an example of a waveform outputted by the conversion table using the inverse function of a logarithmic function 74 shown in FIG. 16.

As shown in FIG. 17 (a), slops a1, a2, a3, and a4 of the straight line Y and respective periods of its straight parts are made variable, thereby making it possible to change the shape of the parabolic waveform Y^b shown in FIG. 17 (b). Further, b is made variable, thereby making it possible to change the degree of the parabolic waveform Y^b. Particularly, the correction waveform in the vertical scanning period of time shown in FIG. 15 (b) can be obtained by making the slops a1 and a4 variable.

Although in the example shown in FIG. 17, the correction waveform in the vertical scanning period of time is divided into four parts, the present invention is not limited to the same. It can be divided into an arbitrary number of parts.

Figure 18:
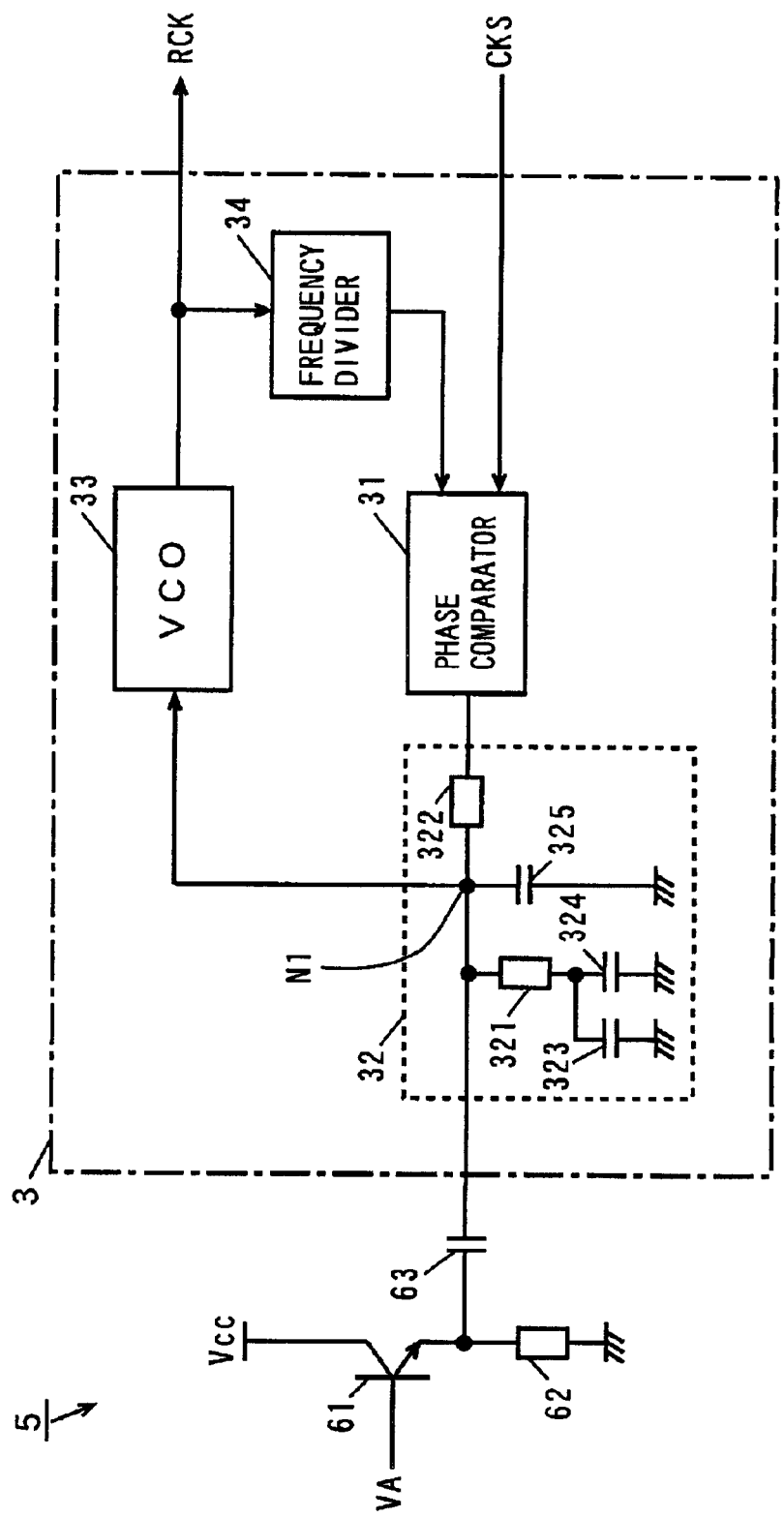
FIG. 18 is a circuit diagram showing an example of the configuration of a readout PLL circuit and a capacitive coupling circuit shown in FIG. 1.

FIG. 18 is a circuit diagram showing an example of the configuration of the readout PLL circuit and the capacitive coupling circuit 5 shown in FIG. 1.

As shown in FIG. 18, a loop filter 32 in the readout PLL circuit 3 is constituted by resistors 321 and 322 and capacitors 323, 324, and 325. Although in FIG. 18, a Lag-lead filter is used as the loop filter, other filters such as a Lag filter and an active filter may be used. The loop filter 32 smoothes an output voltage of a phase comparator 31, and feeds the smoothed voltage to a VCO 33 through a node N1.

The capacitive coupling circuit 5 is constituted by an emitter follower transistor 61, a resistor 62, and a capacitor 63. The transistor 61 has its base fed with an inner pincushion distortion correction voltage VA generated by the inner pincushion distortion correction voltage generation circuit 4 shown in FIG. 1, has its collector fed with a power supply voltage Vcc, and has its emitter grounded through the resistor 62 and connected to the node N1 in the loop filter 32 through the capacitor 63.

An emitter voltage of the transistor 61 is changed in response to the inner pincushion distortion correction voltage VA, and is fed to the node N1 through the capacitor 63. Consequently, the inner pincushion distortion correction voltage VA is superimposed on the output voltage of the phase comparator 31.

The capacitive coupling circuit 5 shown in FIG. 18 is constituted by a small number of components, so that the cost is reduced.

Figure 19:
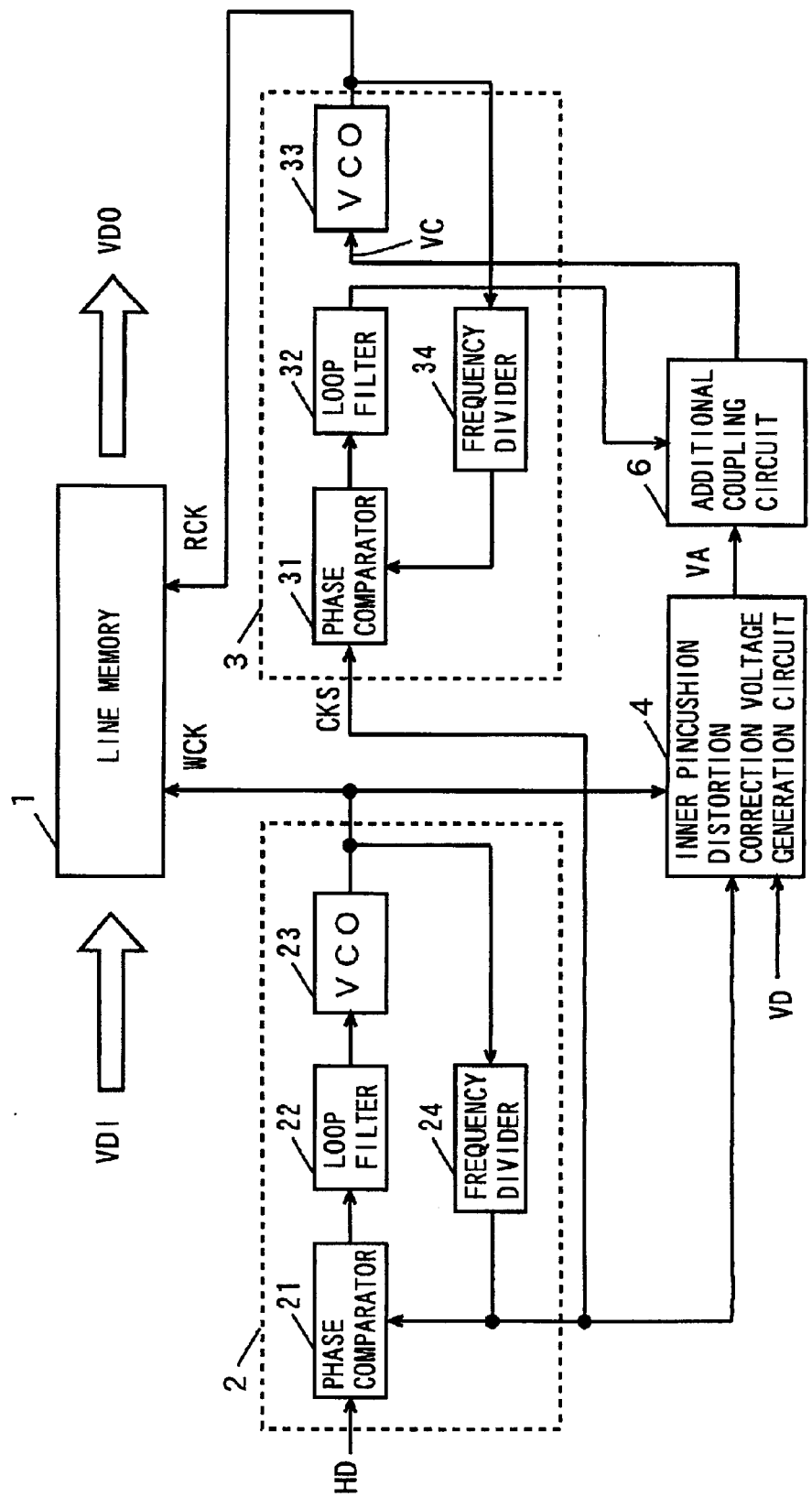
FIG. 19 is a block diagram showing the configuration of an image distortion correcting apparatus according to a second embodiment of the present invention.

FIG. 19 is a block diagram showing an image distortion correcting apparatus in a second embodiment of the present invention.

The image distortion correcting apparatus shown in FIG. 19 differs from the image distortion correcting apparatus shown in FIG. 1 in that an additional coupling circuit 6 is provided in place of the capacitive coupling circuit 5 shown in FIG. 1. An output voltage of a loop filter 32 is fed to the additional coupling circuit 6, and an output voltage of the additional coupling circuit 6 is fed to a VCO 33 as a control voltage VC. In the present embodiment, the additional coupling circuit 6 corresponds to a distortion correction waveform superimposing circuit.

Figure 20:
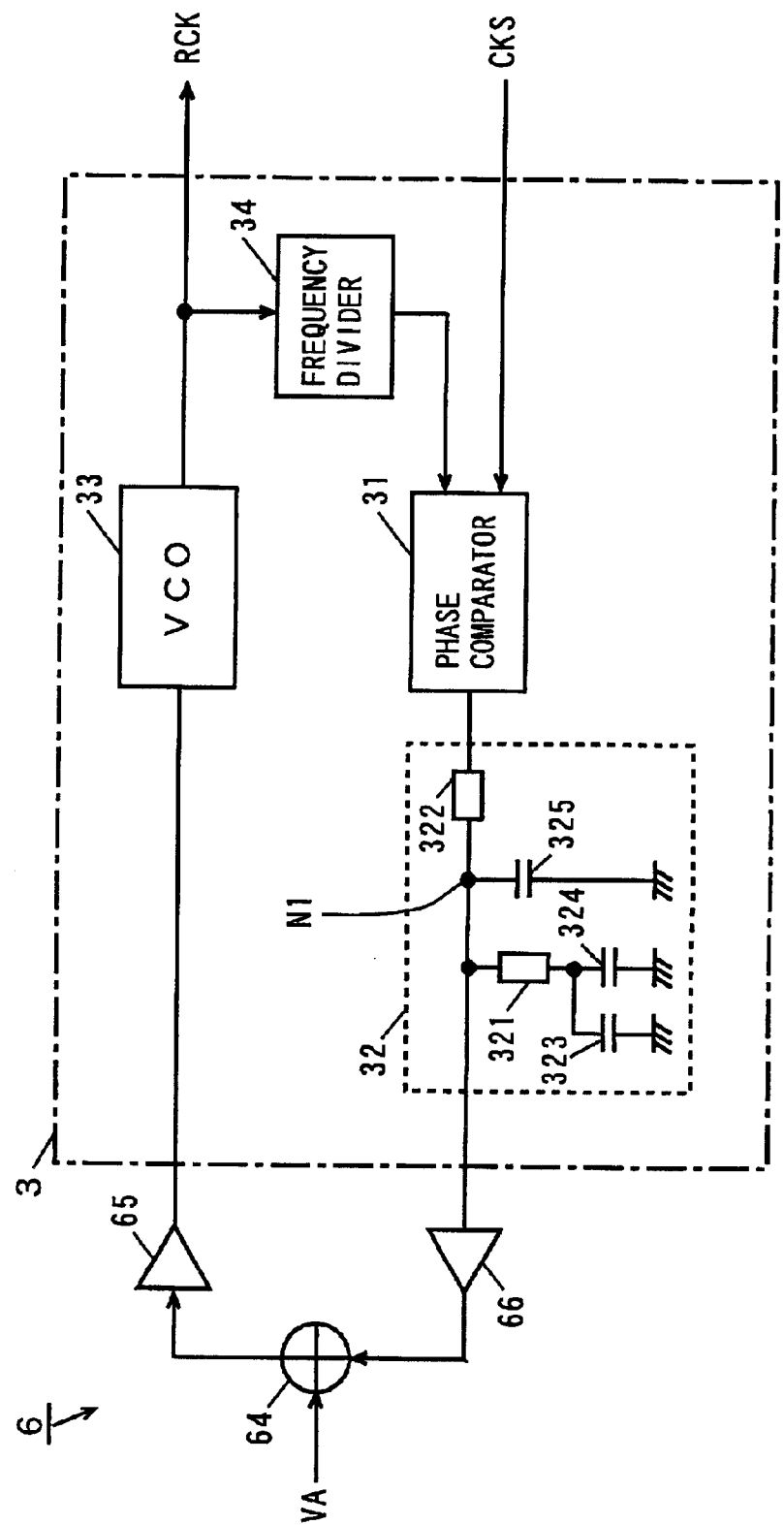
FIG. 20 is a circuit diagram showing an example of the configuration of a readout PLL circuit and an additional coupling circuit shown in FIG. 19.

FIG. 20 is a circuit diagram showing an example of the configuration of the readout PLL circuit 3 and the additional coupling circuit 6 shown in FIG. 19.

In FIG. 20, the additional coupling circuit 6 comprises an inversion adder 64, an inversion amplifier 65, and a non-inversion amplifier (a voltage follower) 66. The configuration of a loop filter 32 in the readout PLL circuit 3 is the same as the configuration shown in FIG. 19. Other filters such as a Lag filter and an active filter may be used as the loop filter.

An inner pincushion distortion correction voltage VA generated by an inner pincushion distortion correction voltage generation circuit 4 shown in FIG. 20 is fed to one of input terminals of the inversion adder 64. An output voltage of a node N1 in the loop filter 32 is fed to the other input terminal of the inversion adder 64 through the non-inversion amplifier 66. An output voltage at an output terminal of the inversion adder 64 is fed to a VCO 33 through the inversion amplifier 65 as a control voltage VC.

The inner pincushion distortion correction voltage VA and the output voltage of the loop filter 32 are added and inverted by the inversion adder 64, are inverted by the inversion amplifier 65, and are fed to the VCO 33.

In the additional coupling circuit 6 shown in FIG. 20, the non-inversion amplifier 66 is connected between the other input terminal of the inversion adder 64 and the output node N1 in the loop filter 32. Accordingly, the inner pincushion distortion correction voltage VA is prevented from being distorted by the effect of the loop filter 32.

Although in the above-mentioned embodiment, the present invention is applied to a case where the inner pincushion distortion is corrected, the present invention is also applicable to a case where horizontal linearity correction is made.

What is claimed is:

1. An image distortion correcting apparatus for correcting distortion in an image displayed on a screen on the basis of a video signal, comprising:
   a storage device for storing the video signal;
   a write clock signal generation circuit for generating a write clock signal for writing an inputted video signal into said storage device;
   a read clock signal generation circuit for generating a read clock signal for reading out the video signal stored in said storage device;
   a distortion correction waveform generation circuit for generating a distortion correction waveform for correcting the distortion in the image by shifting the positions of pixels displayed on the screen on the basis of the video signal; and
   a read clock signal control circuit for controlling the frequency of the read clock signal generated by said read clock signal generation circuit on the basis of said distortion correction waveform generated by said distortion correction waveform generation circuit,
   said distortion correction waveform generation circuit setting said distortion correction waveform such that the amount of shift of the pixel reaches zero at both ends and the center of the image in the horizontal scanning direction.

2. The image distortion correcting apparatus according to claim 1, wherein
   said distortion correction waveform generation circuit comprises
   a first correction waveform generation circuit for generating a first correction waveform which is changed in a horizontal scanning period of time,
   a second correction waveform generation circuit for generating a second correction waveform which is changed in a vertical scanning period of time, and
   a modulation circuit for modulating said first correction waveform generated by said first correction waveform generation circuit by said second correction waveform generated by said second correction waveform generation circuit, to obtain said distortion correction waveform.

3. The image distortion correcting apparatus according to claim 2, wherein
   said second correction waveform has inflection points, the slope of at least one of a plurality of portions of said second correction waveform which are divided at said inflection points being variably set.

4. The image distortion correcting apparatus according to claim 2, wherein
   said modulation circuit comprises a multiplication circuit for multiplying said first correction waveform generated by said first correction waveform generation circuit and said second correction waveform generated by said second correction waveform generation circuit.

5. The image distortion correcting apparatus according to claim 2, wherein
   said modulation circuit comprises an amplification circuit comprising an input terminal receiving said first correction waveform generated by said first correction waveform generation circuit and a gain control terminal receiving said second correction waveform generated by said second correction waveform generation circuit.

6. The image distortion correcting apparatus according to claim 2, wherein
   said first correction waveform corresponds to the change in the frequency of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and
   said second correction waveform is set such that the amplitudes thereof at the upper and lower ends in the vertical direction of the screen are larger than that at the center thereof.

7. The image distortion correcting apparatus according to claim 2, wherein said first correction waveform corresponds to the change in the frequency of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and said second correction waveform is set such that the amplitude thereof at the center in the vertical direction of the screen is larger than those at the upper and lower ends thereof.

8. The image distortion correcting apparatus according to claim 2, wherein said first correction waveform corresponds to the change in the period of time of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and said second correction waveform is set such that the amplitudes thereof at upper and lower ends in the vertical direction of the screen are larger than that at the center thereof.

9. The image distortion correcting apparatus according to claim 8, wherein said read clock signal generation circuit comprises a phase-locked loop having a voltage-controlled oscillator for generating said read clock-signal, said distortion correction waveform generation circuit further comprises a conversion circuit for converting said distortion correction waveform obtained by said modulation circuit into a distortion correction voltage corresponding to the change in the frequency of said read clock signal, and said read clock signal generation circuit superimposes said distortion correction voltage outputted by said distortion correction waveform generation circuit on an oscillation frequency control voltage of said voltage controlled oscillator of said phase-locked loop.

10. The image distortion correcting apparatus according to claim 9, further comprising a correction pulse addition circuit for adding a correction pulse to said distortion correction voltage obtained by said conversion circuit in a horizontal blanking interval such that the average of the distortion correction voltage in each horizontal scanning interval of the video signal becomes a predetermined value.

11. The image distortion correcting apparatus according to claim 2, wherein said first correction waveform corresponds to the change in the period of time of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero in this order, and said second correction waveform is set such that the amplitude thereof at the center in the vertical direction of the screen is larger than those at the upper and lower ends thereof.

12. The image distortion correcting apparatus according to claim 11, wherein said read clock signal generation circuit comprises a phase-locked loop having a voltage-controlled oscillator for generating said read clock signal, said distortion correction waveform generation circuit further comprises a conversion circuit for converting said distortion correction waveform obtained by said modulation circuit into a distortion correction voltage corresponding to the change in the frequency of said read clock signal, and said read clock signal generation circuit superimposes said distortion correction voltage outputted by said distortion correction waveform generation circuit on an oscillation frequency control voltage of said voltage controlled oscillator of said phase-locked loop.

13. The image distortion correcting apparatus according to claim 12, further comprising a correction pulse addition circuit for adding a correction pulse to said distortion correction voltage obtained by said conversion circuit in a horizontal blanking interval such that the average of the distortion correction voltage in each horizontal scanning interval of the video signal becomes a predetermined value.

14. The image distortion correcting apparatus according to claim 1, wherein said read clock signal generation circuit comprises a phase-locked loop having a voltage-controlled oscillator for generating said read clock signal, said distortion correction waveform generation circuit outputs said distortion correction waveform as a distortion correction voltage, and said read clock signal control circuit superimposes said distortion correction voltage outputted by said distortion correction waveform generation circuit on an oscillation frequency control voltage of said voltage controlled oscillator of said phase-locked loop.

15. The image distortion correcting apparatus according to claim 14, further comprising a correction pulse addition circuit for adding a correction pulse to said distortion correction voltage in a horizontal blanking interval such that the average of the distortion correction voltage in each horizontal scanning interval of the video signal becomes a predetermined value.

16. The image distortion correcting apparatus according to claim 15, wherein said correction pulse addition circuit adds said correction pulse to said distortion correction voltage before the time point where phase comparison in said phase-locked loop is made in the horizontal blanking interval such that the average of the distortion correction voltage becomes a predetermined value for each horizontal scanning interval.

17. The image distortion correcting apparatus according to claim 14, wherein
said phase-locked loop further has a frequency divider for dividing the frequency of the read clock signal outputted from said voltage controlled oscillator, a phase comparator for comparing the phase of an output signal of said frequency divider and the phase of a predetermined reference signal, and a loop filter for smoothing an output voltage of said phase comparator and inputting the smoothed output voltage to said voltage controlled oscillator through an output node, and
said read clock signal control circuit comprises an emitter follower transistor having its base receiving said distortion correction voltage outputted by said distortion correction waveform generation circuit, and a capacitance provided between the emitter of said transistor and said output node of said loop filter of said phase-locked loop.

18. The image distortion correcting apparatus according to claim 14, wherein
said phase-locked loop further has a frequency divider for dividing the frequency of the read clock signal outputted from said voltage controlled oscillator, a phase comparator for comparing the phase of an output signal of said frequency divider and the phase of a predetermined reference signal, and a loop filter for smoothing an output voltage of said phase comparator, and
said read clock signal control circuit comprises an addition circuit for adding said distortion correction voltage outputted by said distortion correction waveform generation circuit and an output voltage of said loop filter of said phase-locked loop and feeding a voltage obtained by the addition to said voltage controlled oscillator.

19. An image distortion correcting method for correcting distortion in an image displayed on a screen on the basis of a video signal, comprising the steps of:
generating a write clock signal for writing an inputted video signal into a storage device;
generating a read clock signal for reading out the video signal stored in said storage device;
generating a distortion correction waveform for correcting the distortion in the image by shifting the positions of pixels displayed on the screen on the basis of the video signal;
controlling the frequency of said read clock signal on the basis of said generated distortion correction waveform; and
setting said distortion correction waveform such that the amount of shift of the pixel reaches zero at both ends and the center of the image in the horizontal scanning direction.

20. The image distortion correcting method according to claim 19, wherein
the step of generating said distortion correction waveform comprises the steps of
generating a first correction waveform which is changed in a horizontal scanning period of time,
generating a second correction waveform which is changed in a vertical scanning period of time, and
modulating said first correction waveform by said second correction waveform, to obtain said distortion correction waveform.

21. The image distortion correcting method according to claim 20, wherein
said second correction waveform has inflection points, and the step of generating said distortion correction waveform further comprises the step of variably setting the slope of at least one of a plurality of portions of said second correction waveform which are divided at said inflection points.

22. The image distortion correcting method according to claim 20, wherein
said first correction waveform corresponds to the change in the frequency of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and
said second correction waveform is set such that the amplitudes thereof at the upper and lower ends in the vertical direction of the screen are larger than that at the center thereof.

23. The image distortion correcting apparatus according to claim 20, wherein
said first correction waveform corresponds to the change in the frequency of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is defined as zero, negative, zero, positive, and zero in this order, and the amount of shift of the pixel between the center and the right end is defined as zero, positive, zero, negative, and zero in this order, and
said second correction waveform is set such that the amplitude thereof at the center in the vertical direction of the screen is larger than those at the upper and lower ends thereof.

24. The image distortion correcting method according to claim 20, wherein
said first correction waveform corresponds to the change in the period of time of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, positive, zero, negative, and zero in this order, and the amount of shift of the pixel between the center and the right end is varied as zero, negative, zero, positive, and zero in this order, and
said second correction waveform is set such that the amplitudes thereof at the upper and lower ends in the vertical direction of the screen are larger than that at the center thereof.

25. The image distortion correcting method according to claim 24, wherein
the step of generating said read clock signal comprises the step of generating said read clock signal by a phase-locked loop having a voltage controlled oscillator, the step of generating said distortion correction waveform further comprises the step of converting said distortion correction waveform into a distortion correction voltage corresponding to the change in the frequency of said read clock signal and outputting the distortion correction voltage, and the step of controlling the frequency of said read clock signal comprises the step of superimposing said outputted distortion correction voltage on an oscillation frequency control voltage of said voltage controlled oscillator of said phase-locked loop.

26. The image distortion correcting method according to claim 20, wherein said first correction waveform corresponds to the change in the period of time of said read clock signal, and is set such that in a case where the amount of shift of the pixel is defined as positive when the pixel shifts in the scanning direction on the screen which is scanned from the left to the right, the amount of shift of the pixel reaches zero at the left end, the center, and the right end of the screen, the amount of shift of the pixel between the left end and the center is varied as zero, negative, zero, positive, and zero in this order, and the amount of shift of the pixel between the center and the right end is varied as zero, positive, zero, negative, and zero In this order, and said second correction waveform is set such that the amplitude thereof at the center in the vertical direction of the screen is larger than those at the upper and lower ends thereof.

27. The image distortion correcting method according to claim 26, wherein the step of generating said read clock signal comprises the step of generating said read clock signal by a phase-locked loop having a voltage controlled oscillator, the step of generating said distortion correction waveform comprises the step of converting said distortion correction waveform into a distortion correction voltage corresponding to the change in the frequency of said read clock signal, and the step of controlling the frequency of said read clock signal comprises the step of superimposing said outputted distortion correction voltage on an oscillation frequency control voltage of said voltage controlled oscillator of said phase-locked loop.

28. The image distortion correcting method according to claim 19, wherein the step of generating said read clock signal comprises the step of generating said read clock signal by a phase-locked loop having a voltage controlled oscillator, the step of generating said distortion correction waveform comprises the step of outputting said distortion correction waveform as a distortion correction voltage, and the step of controlling the frequency of said read clock signal comprises the step of superimposing said outputted distortion correction voltage on an oscillation frequency control voltage of said voltage controlled oscillator of said phase-locked loop.

29. The image distortion correcting method according to claim 28, further comprising the step of adding a correction pulse to said distortion correction voltage in a horizontal blanking interval such that the average of the distortion correction voltage in each horizontal scanning interval of the video signal becomes a predetermined value.

30. The image distortion correcting method according to claim 29, wherein the step of adding said correction pulse comprises the step of adding said correction pulse to said distortion correction voltage before the time point where phase comparison in said phase-locked loop is made in the horizontal blanking interval such that the average of the distortion correction voltage becomes a predetermined value for each horizontal scanning interval.

31. An image distortion correcting apparatus for correcting distortion in an image displayed on a screen on the basis of a video signal, comprising:

storage means for storing the video signal;

write clock signal generation means for generating a write clock signal for writing an inputted video signal into said storage means;

read clock signal generation means for generating a read clock signal for reading gut the video signal stored in said storage means;

distortion correction waveform generation means for generating a distortion correction waveform for correcting the distortion in the image by shifting the positions of pixels displayed on the screen on the basis of the video signal; and read clock signal control means for controlling the frequency of the read clock signal generated by said read clock signal generation means on the basis of said distortion correction waveform generated by said distortion correction waveform generation means, said distortion correction waveform generation means setting said distortion correction waveform such that the amount of shift of the pixel reaches zero at both ends and the center of the image in the horizontal-scanning direction.

* * * * *

UNITED STATES PATENT AND TRADEMARK OFFICE
CERTIFICATE OF CORRECTION

PATENT NO. : 6,989,872 B2
APPLICATION NO. : 10/088106
DATED : January 24, 2006
INVENTOR(S) : M. Nakatsuji et al.

Page 1 of 1

It is certified that error appears in the above-identified patent and that said Letters Patent is hereby corrected as shown below:

At column 31, line 24 of the printed patent, "In" should be --in--.

Signed and Sealed this

Twelfth Day of September, 2006

JON W. DUDAS
*Director of the United States Patent and Trademark Office*